United States Patent
Ko et al.

(10) Patent No.: US 10,579,191 B2
(45) Date of Patent: Mar. 3, 2020

(54) TOUCH SENSOR INCLUDING ROUNDED CORNER AND SENSING ELECTRODE INCLUDING ROUNDED EDGE CORRESPONDING TO ROUNDED CORNER, AND DISPLAY DEVICE INCLUDING THE SAME

(71) Applicant: Samsung Display Co., Ltd., Yongin-si (KR)

(72) Inventors: Gwang Bum Ko, Yongin-si (KR); Soo Jung Lee, Yongin-si (KR); Jeong Yun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 24 days.

(21) Appl. No.: 15/868,964

(22) Filed: Jan. 11, 2018

(65) Prior Publication Data
US 2019/0004626 A1    Jan. 3, 2019

(30) Foreign Application Priority Data
Jun. 28, 2017 (KR) .................. 10-2017-0081992

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC .................. G06F 3/044; G06F 3/0412
See application file for complete search history.

(56) References Cited

U.S. PATENT DOCUMENTS

| 8,970,515 B2 | 3/2015 | Moran et al. |
| 9,081,453 B2 | 7/2015 | Bulea et al. |

(Continued)

FOREIGN PATENT DOCUMENTS

| CN | 107390920 | 11/2017 |
| KR | 10-2011-0127236 | 11/2011 |

(Continued)

OTHER PUBLICATIONS

Database WPI, Derwent World Patents Index, Database Accession No. 2017-81538E & CN107390920A, Week 201782, Thomson Scientific, London, GB (providing an Abstract for CN 107390920).

(Continued)

*Primary Examiner* — Lisa S Landis
(74) *Attorney, Agent, or Firm* — H.C. Park & Associates, PLC

(57) ABSTRACT

A touch sensor includes a base, first sensing electrode columns (FSECs), and second sensing electrode columns (SSECs). The base includes a sensing region (SR) including a rounded corner (RC), and a non-SR outside the SR. The FSECs extend in a direction on the base, each FSEC among the FSECs including first sensing electrodes (FSEs), each FSE among the FSEs including sub-electrodes. The SSECs are alternately disposed with the FSECs on the base, each SSEC among the SSECs including second sensing electrodes (SSEs). Sub-electrodes of one of adjacent FSEs among the FSEs are electrically connected to respective sub-electrodes of another of the adjacent FSEs. A sub-electrode closest to the RC among the sub-electrodes includes a rounded edge (RE) corresponding to the RC. A SSE closest to the RC among the SSEs includes a RE corresponding to the RC, and a protrusion part protruding toward the sub-electrode including the RE.

35 Claims, 15 Drawing Sheets

(56) References Cited

U.S. PATENT DOCUMENTS

| | | |
|---|---|---|
| 9,733,761 B2 | 8/2017 | Ku et al. |
| 2013/0015865 A1 | 1/2013 | Izumi |
| 2014/0118280 A1 | 5/2014 | Chang et al. |
| 2016/0216838 A1 | 7/2016 | Aina et al. |
| 2017/0075491 A1 | 3/2017 | Ye et al. |
| 2017/0185224 A1* | 6/2017 | Nagata .................... G06F 3/044 |
| 2017/0228068 A1 | 8/2017 | Pu et al. |
| 2018/0299999 A1* | 10/2018 | Jeong .................... G06F 3/0412 |

FOREIGN PATENT DOCUMENTS

| | | |
|---|---|---|
| KR | 10-1424657 | 7/2014 |
| KR | 10-2016-0084941 | 7/2016 |
| WO | 2015182473 | 12/2015 |
| WO | 2017016291 | 2/2017 |

OTHER PUBLICATIONS

Extended European Search Report dated Oct. 29, 2018, in European Patent Application No. 18168607.2.

* cited by examiner

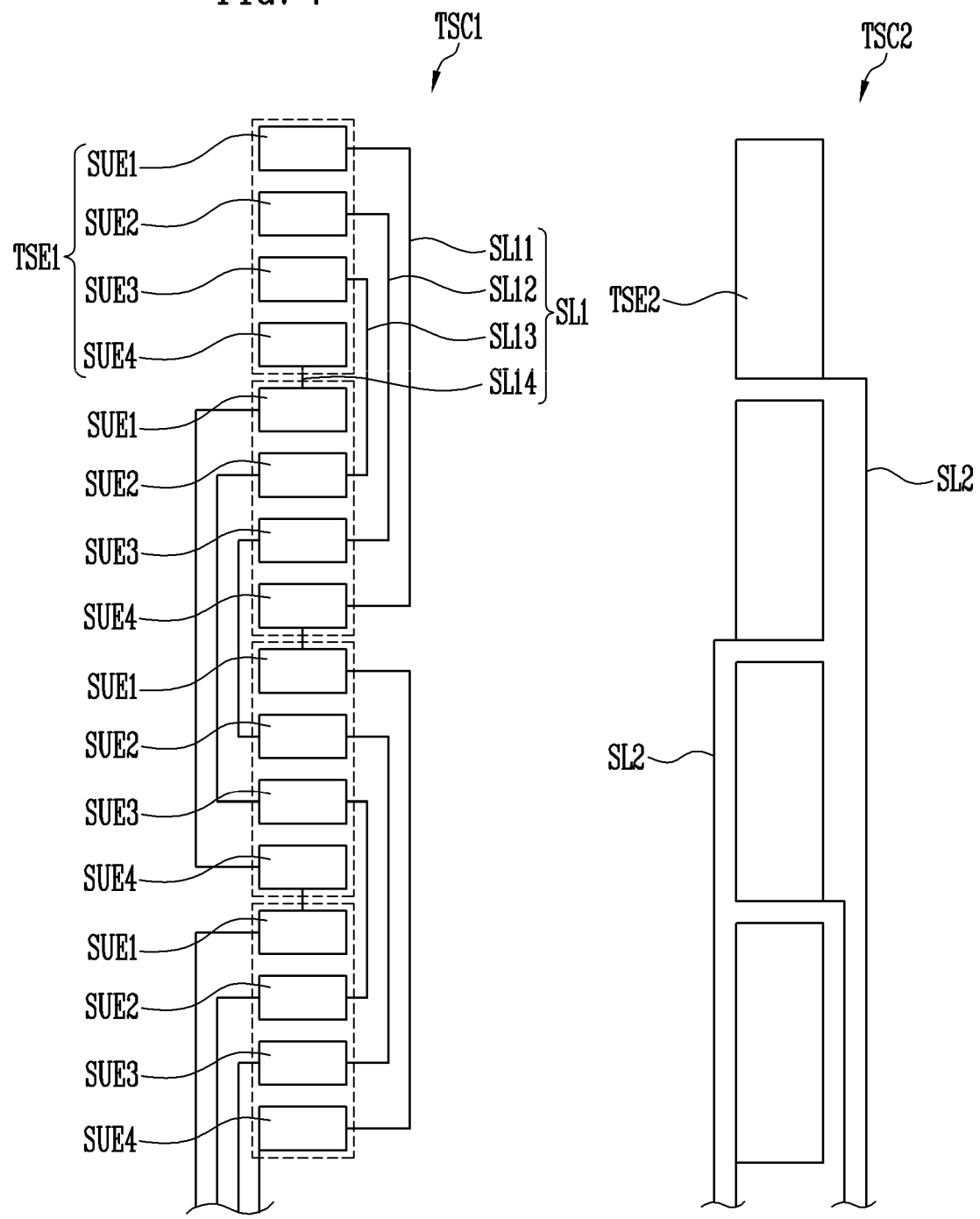

TOUCH SENSOR INCLUDING ROUNDED CORNER AND SENSING ELECTRODE INCLUDING ROUNDED EDGE CORRESPONDING TO ROUNDED CORNER, AND DISPLAY DEVICE INCLUDING THE SAME

CROSS-REFERENCE TO RELATED APPLICATION

This application claims priority from and the benefit of Korean Patent Application No. 10-2017-0081992, filed Jun. 28, 2017, which is hereby incorporated by reference for all purposes as if fully set forth herein.

BACKGROUND

Field

The disclosure generally relates to a touch sensor and a display device including the same.

Discussion

Display devices may include an information input function along with an image display function. The information input function may be generally implemented by a touch sensor for receiving user input. The touch sensor may be attached to one surface of a display panel that displays an image or may be integrally formed with the display panel. A user may input information by pressing, touching, or otherwise interacting with the touch sensor while viewing an image displayed on the display panel.

The above information disclosed in this section is only for understanding the background of the inventive concepts, and, therefore, may contain information that does not form prior art.

SUMMARY

Some exemplary embodiments are capable of providing a touch sensor having a decreased difference in touch sensitivity.

Some exemplary embodiments are capable of providing a display device including the touch sensor.

Additional aspects will be set forth in the detailed description which follows, and, in part, will be apparent from the disclosure, or may be learned by practice of the inventive concepts.

According to one or more exemplary embodiments, a touch sensor includes a base, first sensing electrode columns, and second sensing electrode columns. The base includes a sensing region including a rounded corner, and a non-sensing region outside the sensing region. The first sensing electrode columns extend in a first direction on the base, each first sensing electrode column among the first sensing electrode columns including first sensing electrodes, each first sensing electrode among the first sensing electrodes including sub-electrodes. The second sensing electrode columns are alternately disposed with the first sensing electrode columns on the base, each second sensing electrode column among the second sensing electrode columns including second sensing electrodes. Sub-electrodes of one of adjacent first sensing electrodes among the first sensing electrodes are electrically connected to respective sub-electrodes of another of the adjacent first sensing electrodes. A sub-electrode closest to the rounded corner among the sub-electrodes includes a rounded edge corresponding to the rounded corner. A second sensing electrode closest to the rounded corner among the second sensing electrodes includes a rounded edge corresponding to the rounded corner, and a protrusion part protruding toward the sub-electrode including the rounded edge.

According to one or more exemplary embodiments, a touch sensor includes a base, first sensing electrode columns, second sensing electrode columns, and a third sensing electrode. The base includes a sensing region including a rounded corner, and a non-sensing region outside the sensing region. The first sensing electrode columns extend in a first direction on the base, each first sensing electrode column among the first sensing electrode columns including first sensing electrodes, each first sensing electrode among the first sensing electrodes including sub-electrodes. The second sensing electrode columns are alternately disposed with the first sensing electrode columns on the base, each second sensing electrode column among the second sensing electrode columns including second sensing electrodes. The third sensing electrode is closest to the rounded corner among the first sensing electrodes and the second sensing electrodes. Sub-electrodes of one of adjacent first sensing electrodes among the first sensing electrodes are electrically connected to respective sub-electrodes of another of the adjacent first sensing electrodes.

According to one or more exemplary embodiments, a display device includes a display panel and a touch sensor. The display panel is configured to display an image. The touch sensor is on the display panel. The touch sensor includes a sensing region including a rounded corner, and a non-sensing region outside the sensing region. The touch sensor further includes first sensing electrode columns, and second sensing electrode columns. The first sensing electrode columns extend in a first direction, each first sensing electrode column among the first sensing electrode columns including first sensing electrodes, each first sensing electrode among the first sensing electrodes including sub-electrodes. The second sensing electrode columns are alternately disposed with the first sensing electrode columns, each second sensing electrode column among the second sensing electrode columns including second sensing electrodes. Sub-electrodes of one of adjacent first sensing electrodes among the first sensing electrodes are electrically connected to respective sub-electrodes of another of the adjacent first sensing electrodes. A sub-electrode closest to the rounded corner among the sub-electrodes includes a rounded edge corresponding to the rounded corner. A second sensing electrode closest to the rounded corner among the second sensing electrodes includes a rounded edge corresponding to the rounded corner, and a protrusion part protruding toward the sub-electrode including the rounded edge.

According to one or more exemplary embodiments, a display device includes a display panel and a touch sensor. The display panel is configured to display an image. The touch sensor includes a sensing region including a rounded corner, and a non-sensing region outside the sensing region. The touch sensor further includes first sensing electrode columns, second sensing electrode columns, and a third sensing electrode. The first sensing electrode columns extend in a first direction, each first sensing electrode column among the first sensing electrode columns including first sensing electrodes, each first sensing electrode among the first sensing electrodes including sub-electrodes. The second sensing electrode columns are alternately disposed with the first sensing electrode columns, each second sensing electrode column among the second sensing electrode columns including second sensing electrodes. The third sensing electrode is closest to the rounded corner among the first sensing electrodes and the second sensing electrodes. Sub-electrodes of one of adjacent first sensing electrodes among the first sensing electrodes are electrically connected to respective sub-electrodes of another of the adjacent first sensing electrodes.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 7 is a plan view illustrating first sensing electrodes of a first sensing electrode column and first sensing lines shown in FIG. 5 according to some exemplary embodiments.

FIG. 8 is a plan view illustrating second sensing electrodes of a second sensing electrode column and second sensing lines shown in FIG. 5 according to some exemplary embodiments.

DETAILED DESCRIPTION OF THE ILLUSTRATED EMBODIMENTS

Figure 1:
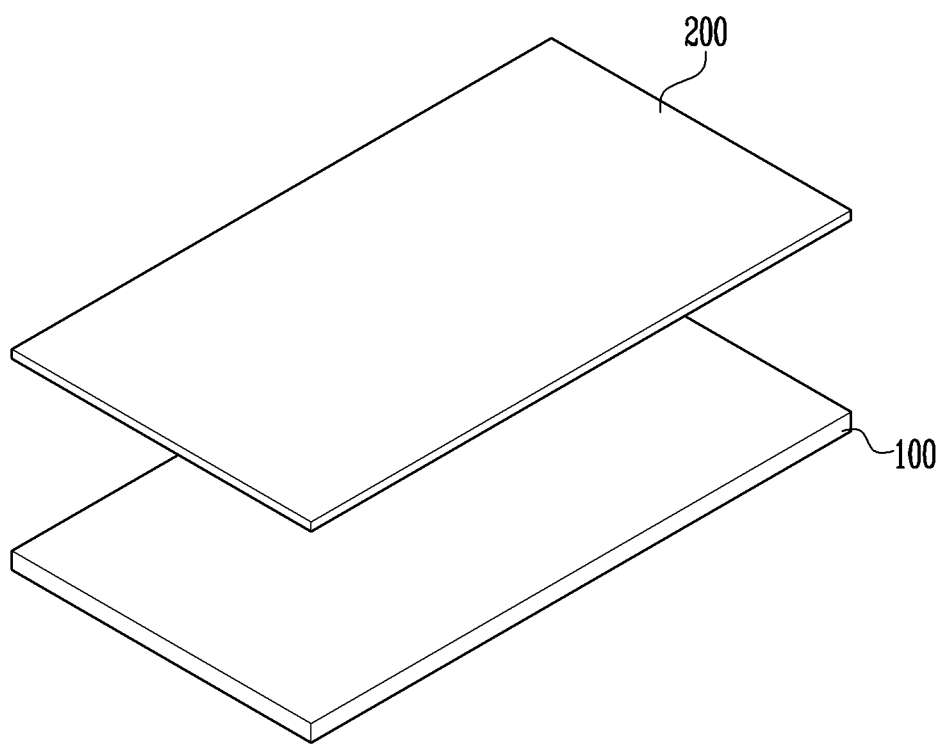
FIG. 1 is an exploded perspective view illustrating a display device including a touch sensor according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. Further, the D1-axis, the D2-axis, and the D3-axis are not limited to three axes of a rectangular coordinate system, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
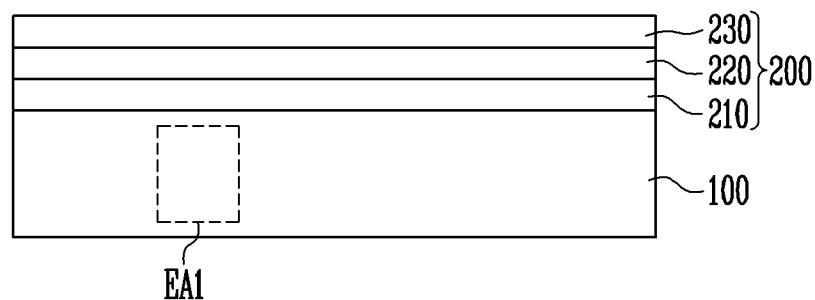
FIG. 2 is a sectional view of the display device shown in FIG. 1 according to some exemplary embodiments.
Figure 3:
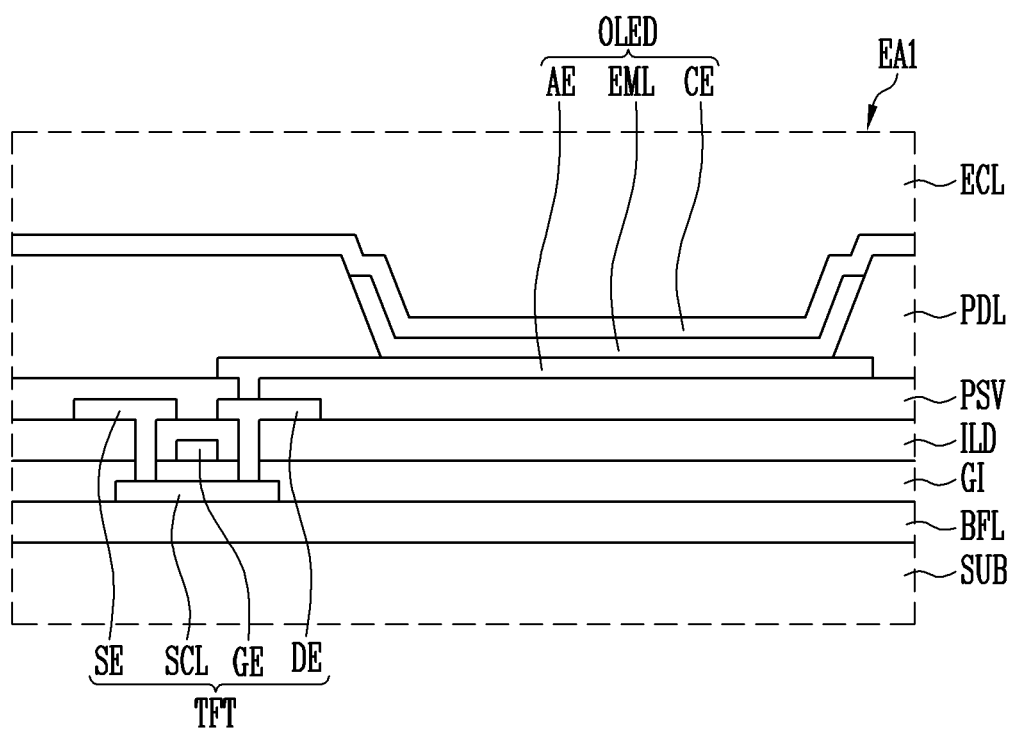
FIG. 3 is an enlarged view of region EA1 shown in FIG. 2 according to some exemplary embodiments.
Figure 4:
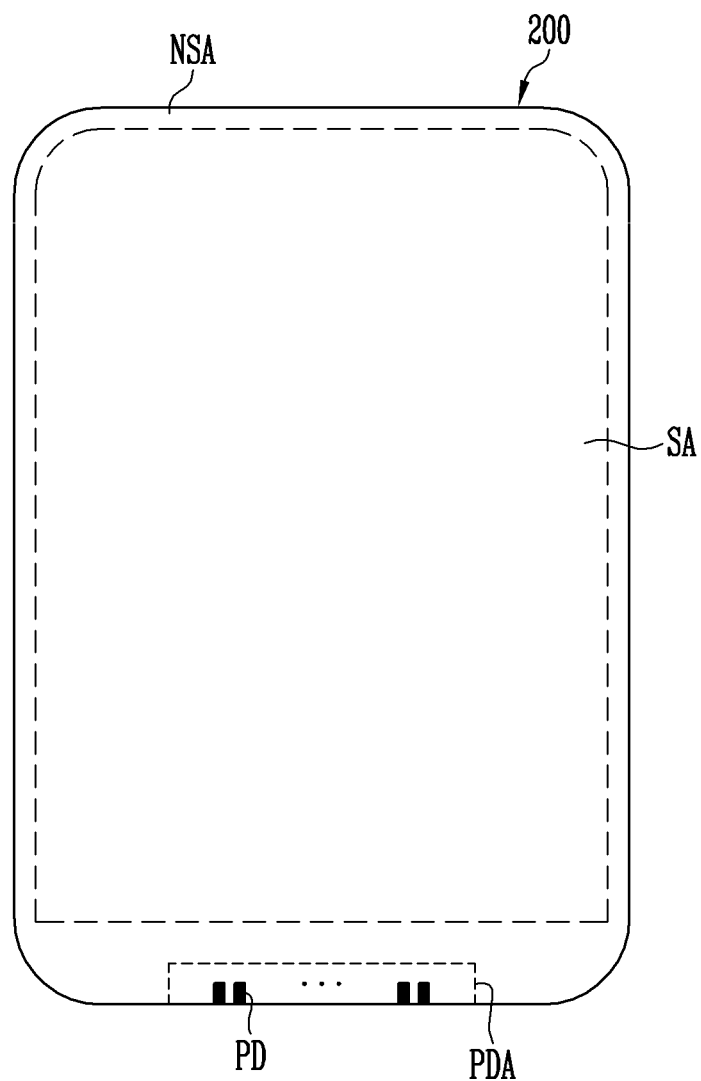
FIG. 4 is a plan view illustrating the touch sensor shown in FIG. 1 according to some exemplary embodiments.
Figure 5:
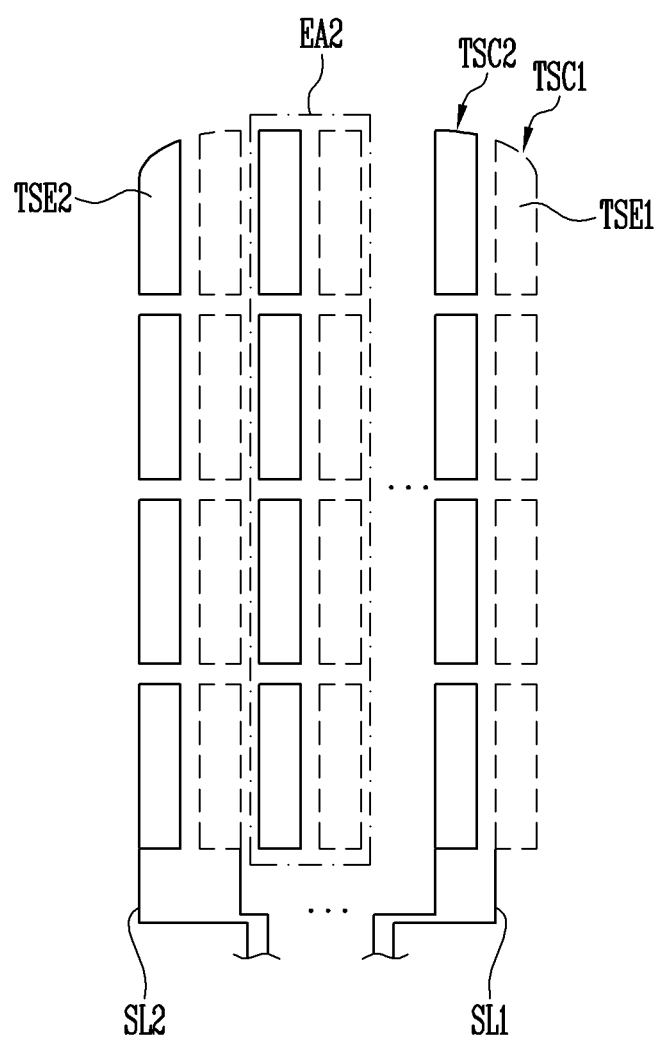
FIG. 5 is a plan view illustrating an arrangement of sensing electrodes of the touch sensor shown in FIG. 1 according to some exemplary embodiments.

FIG. 1 is an exploded perspective view illustrating a display device including a touch sensor according to some exemplary embodiments. FIG. 2 is a sectional view of the display device shown in FIG. 1 according to some exemplary embodiments. FIG. 3 is an enlarged view of region EA1 shown in FIG. 2 according to some exemplary embodiments. FIG. 4 is a plan view illustrating the touch sensor shown in FIG. 1 according to some exemplary embodiments. FIG. 5 is a plan view illustrating an arrangement of sensing electrodes of the touch sensor shown in FIG. 1 according to some exemplary embodiments.

Referring to FIGS. 1 to 5, the display device may include a display panel 100 and a touch sensor 200.

The display panel 100 may display an image, and, as such, may be any suitable form of display panel. For example, self-luminescent display panels, such as an organic light emitting display panel (OLED panel), may be used as the display panel 100. In addition, non-luminescent display panels, such as a liquid crystal display panel (LCD panel), an electrophoretic display panel (EPD panel), and/or an electro-wetting display panel (EWD panel), may be used as the display panel 100. When a non-luminescent display panel is used as the display panel 100, the display device may include a backlight unit (not shown) that supplies light to the display panel 100. For convenience, a case where an OLED panel is used as the display panel 100 is described.

The display panel 100 may have various planar shapes. For example, the display panel 100 may have a closed polygonal shape including at least one linear side. In addition, the display panel 100 may have shapes, such as a circle and an ellipse, which include curved (or arcuate) sides. In addition, the display panel 100 may have shapes, such as a semicircle and a semi-ellipse, which include linear and curved sides.

In some embodiments, when the display panel 100 has linear sides, at least some of corners of a polygonal shape may be formed in a curve. For example, when the display panel 100 has a rectangular shape, corners of the rectangular shape may have a rounded (or arcuate) shape. That is, the display panel 100 may have rounded corners. For instance, a portion at which adjacent linear sides meet each other may be replaced with a curve having a determined curvature. The corner of the rectangular shape may be formed with a curved side having both adjacent ends respectively connected to two adjacent linear sides, the curved side having a determined curvature. The curvature may be differently set depending on positions. For example, the curvature may be changed depending on a position at which the curve is started, a length of the curve, etc. It is also contemplated that compound or polynomial curves may be utilized in association with exemplary embodiments.

The display panel 100 may include a display region and a non-display region provided at a periphery (or outside) of the display region. The display region may have a shape corresponding to that of the display panel 100. For example, the display region may have a closed polygonal shape including linear sides. In addition, the display region may have shapes, such as a circle and an ellipse, which include curved sides. In addition, the display region may have shapes, such as a semicircle and a semi-ellipse, which include linear and curved sides.

In some embodiments, when the display panel 100 has linear sides, at least some of corners of a polygonal shape may be formed in a curve. That is, the display region may have rounded corners. In more detail, when the display region has a rectangular shape, a portion at which adjacent linear sides meet each other may be replaced with a curve having a determined curvature. That is, the corner of the rectangular shape may be formed with a curved side having both adjacent ends respectively connected to two adjacent linear sides, the curved side having a determined curvature. The curvature may be differently set depending on positions. For example, the curvature may be changed depending on a position at which the curve is started, a length of the curve, etc. It is also contemplated that compound or polynomial curves may be utilized in association with exemplary embodiments.

Although not illustrated, a plurality of pixels may be provided in the display region. Each pixel may be any one of a red pixel, a green pixel, a blue pixel, and a white pixel, but embodiments are not limited thereto. For example, the pixel may be any one of a magenta pixel, a cyan pixel, a yellow pixel, etc.

In addition, the display panel 100 may include a driving unit (not shown) that is provided at one side of a substrate SUB and drives the pixels. The driving unit may be a chip-on-glass (COG) type of driving element; however, embodiments are not limited thereto.

Each of the pixels may include at least one thin film transistor TFT provided on the substrate SUB and a display element OLED connected to the thin film transistor TFT. The display element OLED may be an organic light emitting element.

The substrate SUB may include a transparent insulating material that enables light to be transmitted therethrough. The substrate SUB may be a rigid substrate and/or a flexible substrate. The rigid substrate (or substrate portion) may include a glass substrate, a quartz substrate, a glass ceramic substrate, and a crystalline glass substrate. The flexible substrate (or substrate portion) may include a film substrate and a plastic substrate that include a polymer organic material. For example, the flexible substrate may include at least one of polyethersulfone (PES), polyacrylate (PA), polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP). Also, the flexible substrate may include fiber glass reinforced plastic (FRP). The material applied as the substrate SUB may have resistance (e.g., heat resistance) against high processing temperature in a manufacturing process of the display device.

A buffer layer BFL may be provided between the substrate SUB and the thin film transistor TFT. The buffer layer BFL may include an inorganic insulating material. For example, the buffer layer BFL may include at least one of silicon oxide, silicon nitride, and silicon oxynitride. Also, the buffer layer BFL may have a single or multi-layered structure. For example, the buffer layer BFL may have a single-layered structure including one of silicon oxide, silicon nitride, and silicon oxynitride. The buffer layer BFL may include a silicon oxide layer and a silicon nitride layer disposed on the silicon oxide layer. The buffer layer BFL may include three or more insulating layers that are sequentially stacked. The buffer layer BFL may prevent impurities from being diffused into the thin film transistor TFT from the substrate SUB. Also, the buffer layer BFL may planarize a surface of the substrate SUB.

The thin film transistor TFT may be connected to a gate line (not shown) and a data line (not illustrated). The thin film transistor TFT may include a semiconductor (or active) layer SCL, a gate electrode GE, a source electrode SE, and a drain electrode DE.

The semiconductor layer SCL may be disposed on the buffer layer BFL. The semiconductor layer SCL may include at least one of amorphous silicon, polycrystalline silicon, oxide semiconductor, and organic semiconductor. In the semiconductor layer SCL, regions connected to the source electrode SE and the drain electrode DE may be source and drain regions into which impurities are doped or injected. A region between the source region and the drain region may be a channel region. Although not shown, when the semiconductor layer SCL includes an oxide semiconductor, a light blocking layer for blocking light incident into the semiconductor layer SCL may be disposed on the top or bottom of the semiconductor layer SCL.

A gate insulating layer GI may be disposed on the semiconductor layer SCL. The gate insulating layer GI may cover the semiconductor layer SCL, and may insulate the semiconductor layer SCL and the gate electrode GE from each other. The gate insulating layer GI may include at least one of an organic insulating material and an inorganic insulating material. For example, the gate insulating layer GI may include at least one of silicon oxide and silicon nitride.

The gate electrode GE may be disposed on the gate insulating layer GI. The gate electrode GE may be connected to the gate line. The gate electrode GE may include a low-resistance conductive material, and overlap with the semiconductor layer SCL.

An interlayer insulating layer ILD may be disposed over the gate electrode GE. The interlayer insulating layer ILD may include at least one of an organic insulating material and an inorganic insulating material. For example, the interlayer insulating layer ILD may include at least one of silicon oxide and silicon nitride. The interlayer insulating layer ILD may insulate the source electrode SE and the drain electrode DE from the gate electrode GE.

Contact holes passing through the gate insulating layer GI and the interlayer insulating layer ILD may expose the source region and the drain region of the semiconductor layer therethrough.

The source electrode SE and the drain electrode DE may be disposed on the interlayer insulating layer ILD to be spaced apart from each other. The source electrode SE and the drain electrode DE may include a low-resistance conductive material. One end of the source electrode SE may be connected to the data line. The other end of the source electrode SE may be connected to the source region of the semiconductor layer SCL through one of the contact holes. One end of the drain electrode DE may be connected to the drain region through the other of the contact holes. The other end of the drain electrode DE may be connected to the display element OLED.

Although a case where the thin film transistor TFT is a thin film transistor having a top gate structure has been described and illustrated as an example, embodiments are not limited thereto. For example, the thin film transistor TFT may be a thin film transistor having a bottom gate structure, a dual gate structure, etc.

A protective layer PSV may be provided over the thin film transistor TFT. The protective layer PSV may cover the thin film transistor TFT. A portion of the protective layer PSV may be removed to expose one of the source electrode SE and the drain electrode DE, e.g., the drain electrode DE, therethrough. The protective layer PSV may include at least one layer. For example, the protective layer PSV may include an inorganic protective layer and an organic protective layer disposed on the inorganic protective layer. The inorganic protective layer may include at least one of silicon oxide and silicon nitride. The organic protective layer may include at least one of acryl, polyimide (PI), polyamide (PA), and benzocyclobutene (BCB). Also, the organic protective layer may be a planarization layer that is transparent and flexible to reduce and planarize winding (or undulations) of a lower structure.

The display element OLED may be provided on the protective layer PSV. The display element OLED may include a first electrode AE connected to the thin film transistor TFT, an emitting layer EML disposed on the first electrode AE, and a second electrode CE disposed on the emitting layer EML. One of the first electrode AE and the second electrode CE may be an anode electrode, and the other of the first electrode AE and the second electrode CE may be a cathode electrode. For example, the first electrode AE may be an anode electrode, and the second electrode CE may be a cathode electrode.

In addition, at least one of the first electrode AE and the second electrode CE may be a transmissive electrode. For example, when the display element OLED is a bottom emission type organic light emitting element, the first electrode AE may be a transmissive electrode, and the second electrode CE may be a reflective electrode. When the display element OLED is a top emission type organic light emitting element, the first electrode AE may be a reflective electrode, and the second electrode CE may be a transmissive electrode. When the display element OLED is a double-sided emission type organic light emitting element, both of the first electrode AE and the second electrode CE may be transmissive electrodes. For convenience, a case where the display element OLED is a top emission type organic light emitting element and the first electrode AE is an anode electrode is described and illustrated as an example.

In each pixel, the first electrode AE may be disposed on the protective layer PSV. The first electrode AE may include a reflective layer (not shown) configured to reflect light and a transparent conductive layer (not shown) disposed on the top or bottom of the reflective layer. At least one of the reflective layer and the transparent conductive layer may be connected to the drain electrode DE.

The reflective layer may include a material that reflects incident light. For example, the reflective layer may include at least one of aluminum (Al), silver (Ag), chromium (Cr), molybdenum (Mo), platinum (Pt), nickel (Ni), and any alloy thereof.

The transparent conductive layer may include transparent conductive oxide. For example, the transparent conductive layer may include at least one transparent conductive oxide, such as at least one of indium tin oxide (ITO), indium zinc oxide (IZO), aluminum zinc oxide (AZO), gallium doped zinc oxide (GZO), zinc tin oxide (ZTO), gallium tin oxide (GTO), and fluorine doped tin oxide (FTO).

A pixel defining layer PDL may be disposed over the first electrode AE. The pixel defining layer PDL is provided between pixel regions, and may expose the first electrode AE therethrough. The pixel defining layer PDL may overlap with an edge portion of the first electrode AE. In this manner, the pixel defining layer PDL may allow a majority of a surface of the first electrode AE to be exposed therethrough. The pixel defining layer PDL may include an organic insulating material. For example, the pixel defining layer PDL may include at least one of polystyrene, polymethyl methacrylate (PMMA), polyacrylonitrile (PAN), polyamide (PA), polyimide (PI), polyarylether (PAE), heterocyclic polymer, parylene, epoxy, benzocyclobutene (BCB), siloxane based resin, and silane based resin.

The emitting layer EML may be disposed on the exposed surface of the first electrode AE. The emitting layer EML may have a multi-layered thin film structure including at least a light generation layer (LGL). For example, the emitting layer EML may include a hole injection layer (HIL) for injecting holes and a hole transport layer (HTL) having a hole transporting property such that the HTL increases opportunity for holes and electrons to be re-combined by suppressing movement of electrons that fail to be combined in the LGL, the LGL for emitting light through the re-combination of the injected electrons and holes. The emitting layer EML layer additionally include a hole blocking layer (HBL) for suppressing the movement of holes that fail to be combined in the LGL, an electron transport layer (ETL) transporting electrons to the LGL, and an electron transport layer (EIL) for injecting electrons. The HIL, the HTL, the HBL, the ETL, and the EIL may be common layers connected in adjacent light emitting regions.

The color of light generated from the LGL may be one of red, green, blue, and white, but embodiments are not limited thereto. For example, the color of light generated from the LGL of the emitting layer EML may also be at least one of magenta, cyan, yellow, etc.

The second electrode CE may be disposed on the emitting layer EML. The second electrode CE may be a semi-transmissive reflective layer. For example, the second electrode CE may be a thin metal layer having a thickness through which light can be transmitted. The second electrode CE may allow a portion of the light emitted from the LGL to be transmitted therethrough, and reflect the rest of the light emitted from the LGL. The second electrode CE may include a material having a low work function as compared with the transparent conductive layer, e.g., as compared with the first electrode AE. For example, the second electrode CE may be include at least one of molybdenum (Mo), tungsten (W), silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), and any alloy thereof.

A portion of the light emitted from the emitting layer EML may not be transmitted through the second electrode CE, and the light reflected from the second electrode CE may be again reflected from the reflective layer of the first electrode AE. That is, the light emitted from the emitting layer EML may resonate between the reflective layer and the second electrode CE. The light extraction efficiency of the display element OLED can be improved by the resonance of the light.

A distance between the reflective layer and the second electrode CE may be changed depending on a color of light emitted from the LGL. That is, the distance between the reflective layer and the second electrode CE may be adjusted to correspond to a resonance distance, depending on the color of the light emitted from the LGL.

An encapsulation layer ECL may be provided over the second electrode CE. The encapsulation layer ECL covers the display element OLED and may prevent oxygen and moisture from penetrating into the display element OLED. The encapsulation layer ECL may include a plurality of insulating layers. For example, the encapsulation layer ECL may include a plurality of inorganic layers (not shown) and a plurality of organic layers (not shown). For example, the encapsulation layer ECL may include a first inorganic layer on the second electrode CE, an organic layer on the first inorganic layer, and a second inorganic layer on the organic layer. Here, the inorganic layer may include at least one of silicon oxide, silicon nitride, silicon oxynitride, aluminum oxide, titanium oxide, zirconium oxide, and tin oxide. The organic layer may include at least one of acryl, polyimide (PI), polyamide (PA), and benzocyclobutene (BCB).

Although a case where the encapsulation layer ECL is applied so as to isolate the display element OLED from an external environment is described and illustrated as an example, embodiments are not limited thereto. To isolate the display element OLED from the external environment, an encapsulation substrate may be applied instead of (or in addition to) the encapsulation layer ECL. The encapsulation substrate may be joined with the substrate SUB through a sealant. When the display element OLED is isolated from the external environment using the encapsulation substrate, the encapsulation layer ECL may be omitted.

The touch sensor 200 may have a shape corresponding to that of the display panel 100. For example, the touch sensor 200 may have a closed polygonal shape including linear sides. In addition, the touch sensor 200 may have shapes, such as a circle and an ellipse, which include curved sides. In addition, the touch sensor 200 may have shapes, such as a semicircle and a semi-ellipse, which include linear and curved sides.

In some embodiments, when the touch sensor 200 has linear sides, at least some of corners of a polygonal shape may be formed in a curve. That is, the touch sensor 200 may have rounded (or arcuate) corners. In more detail, when the touch sensor 200 has a rectangular shape, a portion at which adjacent linear sides meet each other may be replaced with a curve having a determined curvature. That is, a vertex portion of the rectangular shape may be formed with a curved side having both adjacent ends respectively connected to two adjacent linear sides, the curved side having a determined curvature. The curvature may be differently set depending on positions. For example, the curvature may be changed depending on a position at which the curve is started, a length of the curve, etc. It is also contemplated that compound or polynomial curves may be utilized in association with exemplary embodiments.

The touch sensor 200 may include a sensing region SA corresponding to the display region and a non-sensing region NSA outside the sensing region SA, e.g., the non-sensing region NSA may be provided at the periphery of the sensing region SA.

The sensing region SA may have a shape corresponding to that of the touch sensor 200. For example, the sensing region SA may have a closed polygonal shape including linear sides. In addition, the sensing region SA may have shapes, such as a circle and an ellipse, which include curved sides. In addition, the sensing region SA may have shapes, such as a semicircle and a semi-ellipse, which include linear and curved sides.

In some embodiments, when the sensing region SA has linear sides, at least some of corners of a polygonal shape may be formed in a curve. That is, the sensing region SA may have rounded corners. For instance, when the sensing region SA has a rectangular shape, a portion at which adjacent linear sides meet each other may be replaced with a curve having a determined curvature. That is, a vertex portion of the rectangular shape may be formed with a curved side having both adjacent ends respectively connected to two adjacent linear sides, the curved side having a determined curvature. The curvature may be differently set depending on positions. For example, the curvature may be changed depending on a position at which the curve is started, a length of the curve, etc.

The touch sensor 200 may be provided on at least one of both surfaces of the display panel 100. For example, the touch sensor 200 may be provided on the encapsulation layer ECL. That is, the encapsulation layer ECL of the display panel 100 may be a base that supports the touch sensor 200. The touch sensor 200 may include a first insulating layer 210 provided on the encapsulation layer ECL, an electrode layer 220 on the first insulating layer 210, and a cover layer 230 on the electrode layer 220.

The first insulating layer 210 may include at least one of an organic insulating material and an inorganic insulating material. For example, the first insulating layer 210 may include at least one of silicon oxide and silicon nitride.

The electrode layer 220 may include a plurality of first sensing electrode columns TSC1 that are provided in the sensing region SA and include a plurality of first sensing electrodes TSE1, a plurality of second sensing electrode columns TSC2 that are provided in the sensing region SA, are alternately disposed with the first sensing electrode columns TSC1, and include a plurality of second sensing electrodes TSE2. The electrode layer 220 may also include a plurality of first sensing lines SL1 that are connected to the first sensing electrodes TSE1 and are provided in the non-sensing region NSA, a plurality of second sensing lines SL2 that are connected to the second sensing electrodes TES2 and are provided in the non-sensing region NSA, and a pad unit (or area) PDA that electrically connects the first sensing electrodes TSE1 and the second sensing electrodes TSE2 to an external driving circuit (not shown) through the first sensing lines SL1 and the second sensing lines SL2, and is provided in the non-sensing region NSA. One of the first sensing electrodes TSE1 and the second sensing electrodes TSE2, e.g., the first sensing electrodes TSE1, may be touch driving electrodes that receive touch driving signals, and the other of the first sensing electrodes TSE1 and the second sensing electrodes TSE2, e.g., the second sensing electrodes TSE2, may be touch receiving electrodes that output touch sensing signals. As such, the electrode layer 220 may detect a touch of a user based on a change in capacitance of a first capacitor formed between the first sensing electrodes TSE1 and the second sensing electrodes TSE2.

Both of the first sensing electrode columns TSC1 and the second sensing electrode columns TSC2 may extend in one direction. In addition, the first sensing electrodes TSE1 may be arranged in the direction in which the first sensing electrode columns TSC1 extend, and the second sensing electrodes TSE2 may be arranged in the direction in which the second sensing electrode columns TSC2 extend. The first sensing electrodes TSE1 and the second sensing electrodes TSE2 may sense a change in capacitance from a touch input of a an object, such as a portion of the body of the user, a stylus pen, etc. In addition, the first sensing electrodes TSE1 and the second sensing electrodes TSE2 may include a conductive material to sense the change in capacitance.

The first sensing lines SL1 and the second sensing lines SL2 may transmit the change in capacitance, which is sensed via the first sensing electrodes TSE1 and the second sensing electrodes TSE2, to an external circuit through the pad unit PDA. In addition, the first sensing lines SL1 and the second sensing lines SL2 may include the same material as the first sensing electrodes TSE1 and the second sensing electrodes TSE2. The pad unit PDA may include a plurality of pads PD. The pads PD may be electrically connected to the first sensing electrodes TSE1 and the second sensing electrodes TSE2 through the first sensing lines SL1 and the second sensing lines SL2.

The cover layer 230 may be provided on the electrode layer 220 to protect the exposed surface of the touch sensor 200, e.g., the electrode layer 220. The cover layer 230 may include at least one of an organic insulating material and an inorganic insulating material. For example, the cover layer 230 may include at least one of silicon oxide and silicon nitride.

Although a case where the cover layer 230 is provided on the electrode layer 220 is described and illustrated as an example, embodiments are not limited thereto. For example, the cover layer 230 may be replaced with (or supplemented by) a transparent window disposed on the electrode layer 220. The window may be a high-strength transparent plastic substrate or a high-strength transparent glass substrate.

Figure 6:
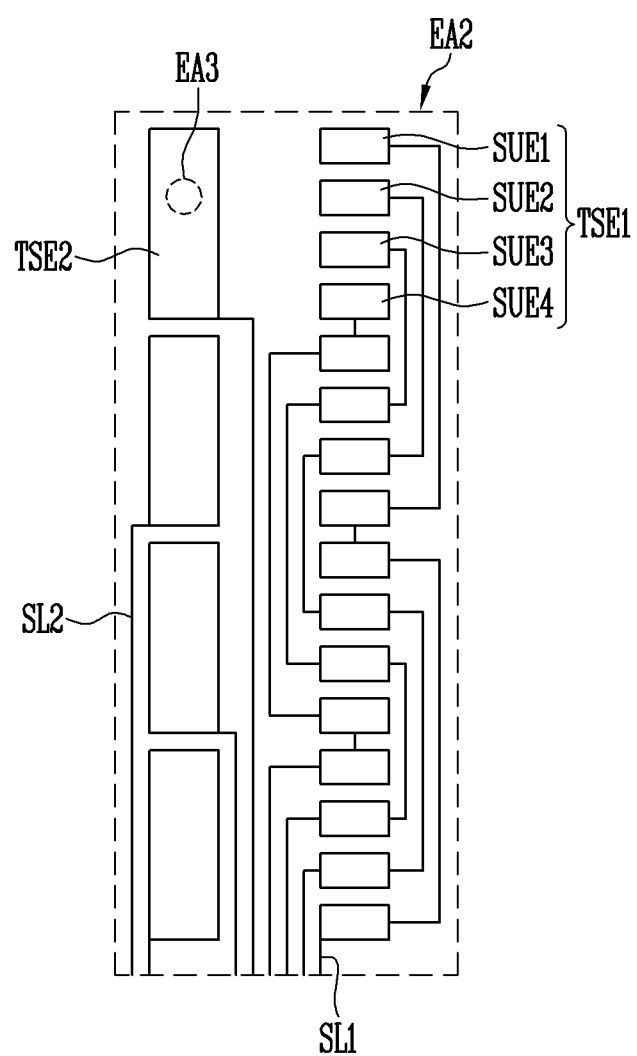
FIG. 6 is an enlarged view of region EA2 of FIG. 5 according to some exemplary embodiments.
Figure 9:
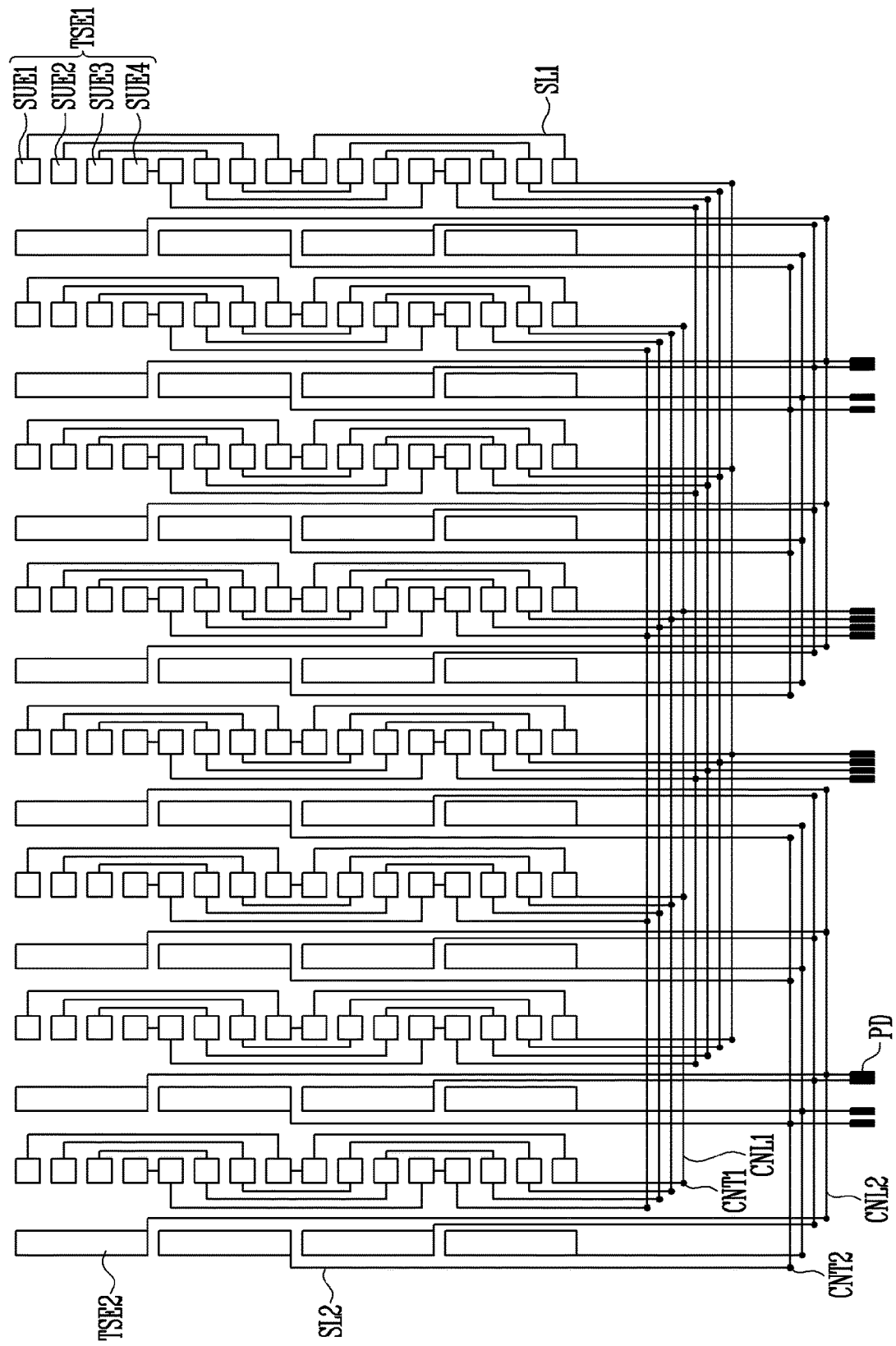
FIG. 9 is a plan view illustrating a connection relationship of first sensing electrodes, second sensing electrodes, first sensing lines, second sensing lines, and a sensing line connection part according to some exemplary embodiments.
Figure 10:
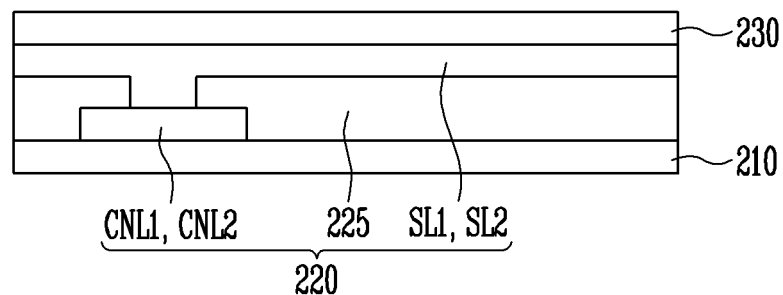
FIG. 10 is a sectional view illustrating a connection relationship of the sensing lines and the sensing line connection part of FIG. 9 according to some exemplary embodiments.
Figure 11:
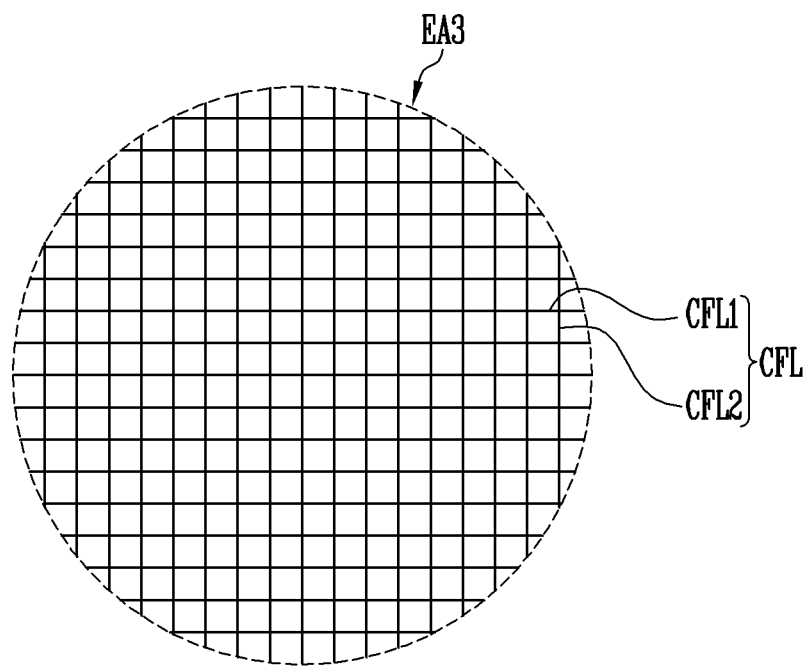
FIG. 11 is an enlarged view of region EA3 of FIG. 6 according to some exemplary embodiments.

FIG. 6 is an enlarged view of region EA2 of FIG. 5 according to some exemplary embodiments. FIG. 7 is a plan view illustrating first sensing electrodes of a first sensing electrode column and first sensing lines shown in FIG. 5 according to some exemplary embodiments. FIG. 8 is a plan view illustrating second sensing electrodes of a second sensing electrode column and second sensing lines shown in FIG. 5 according to some exemplary embodiments. FIG. 9 is a plan view illustrating a connection relationship of first sensing electrodes, second sensing electrodes, first sensing lines, second sensing lines, and a sensing line connection part according to some exemplary embodiments. FIG. 10 is a sectional view illustrating a connection relationship of the sensing lines and the sensing line connection part of FIG. 9 according to some exemplary embodiments. FIG. 11 is an enlarged view of region EA3 of FIG. 6 according to some exemplary embodiments.

Referring to FIGS. 6 to 11, the electrode layer 220 may include a plurality of first sensing electrode columns TSC1 that extend in one direction and are parallel to one another, and a plurality of second sensing electrode columns TSC2 that extend in parallel to the first sensing electrode columns TSC1 and are alternately disposed with the first sensing electrode columns TSC1.

The first sensing electrode columns TSC1 may include a plurality of first sensing electrodes TSE1. For example, one first sensing electrode column TSC1 may include m (m is a natural number of 2 or more) first sensing electrodes TSE1. The first sensing electrodes TSE1 may be arranged in the direction in which the first sensing electrode columns TSC1 extend.

Each of the first sensing electrodes TSE1 may include a plural number of sub-electrodes, e.g., N sub-electrodes SUE1, SUE2, SUE3, and SUE4 disposed to be spaced apart from each other, where N is an integer greater than or equal to 2. In some embodiments, each of the first sensing electrodes TSE1 may include four sub-electrodes SUE1, SUE2, SUE3, and SUE4. That is, each of the first sensing electrodes TSE1 may include a first sub-electrode SUE1, a second sub-electrode SUE2, a third sub-electrode SUE3, and a fourth sub-electrode SUE4. Here, the sub-electrodes SUE1, SUE2, SUE3, and SUE4 may be sequentially arranged in the extending direction of the first sensing electrode columns TSC1. That is, among the sub-electrodes SUE1, SUE2, SUE3, and SUE4, the first sub-electrode SUE1 may be disposed most distant from the pad unit PDA, and the fourth sub-electrode SUE4 may be disposed closest to the pad unit PDA.

The sub-electrodes SUE1, SUE2, SUE3, and SUE4 may be connected to first sensing lines SL1. The first sensing lines SL1 may be disposed in a region in which the first sensing electrode columns TSC1 and the second sensing electrode columns TSC2 are disposed. In addition, the sub-electrodes SUE1, SUE2, SUE3, and SUE4 of one of adjacent first sensing electrodes TSE1 may be electrically connected to the sub-electrodes SUE1, SUE2, SUE3, and SUE4 of the other of the adjacent first sensing electrodes TSE1 through the first sensing lines SL1, respectively.

For example, if each of the first sensing electrodes TSE1 includes N sub-electrodes SUE1, SUE2, SUE3, and SUE4, a J-th sub-electrode of one first sensing electrode TSE1 may be electrically connected an (N−J+1)-th sub-electrode of an adjacent first sensing electrode TSE1 through a first sensing line SL1, where J is a positive integer less than or equal to N. Therefore, if the number of sub-electrodes SUE1, SUE2, SUE3, and SUE4 included in the first sensing electrode TSE1 is N, the number of first sensing lines SL1 corresponding to one first sensing electrode column TSC1 may be N.

For instance, if each of the first sensing electrodes TSE1 includes four sub-electrodes SUE1, SUE2, SUE3, and SUE4, a first sub-electrode SUE1 of one first sensing electrode TSE1 and a fourth sub-electrode SUE4 of an adjacent first sensing electrode TSE1 may be electrically connected to each other through a first, first sensing line SL11. A second sub-electrode SUE2 of the one first sensing electrode TSE1 and a third sub-electrode SUE3 of the adjacent first sensing electrode TSE1 may be electrically connected to each other through a second, first sensing line SL12. A third sub-electrode SUE3 of the one first sensing electrode TSE1 and a second sub-electrode SUE2 of the adjacent first sensing electrode TSE1 may be electrically connected to each other through a third, first sensing line SL13. A fourth sub-electrode SUE4 of the one first sensing electrode TSE1 and a first sub-electrode SUE1 of the adjacent first sensing electrode TSE1 may be electrically connected to each other through a fourth, first sensing line SL14. Therefore, the number of first sensing lines SL1 corresponding to each of the first sensing electrode columns TSC1 may be four.

If the number of first sensing electrodes TSE1 in one first sensing electrode column TSC1 is M, the number of sub-electrodes SUE1, SUE2, SUE3, and SUE4 in one first sensing electrode TSE1 is N, and the sub-electrodes SUE1, SUE2, SUE3, and SUE4 and the first sensing lines SL1 correspond to each other one-by-one, the number of first sensing lines SL1 corresponding to the one first sensing electrode column TSC1 may be M×N, where M is an integer greater than or equal to 2. If the number of first sensing electrode columns TSC1 is P, the electrode layer 220 may include P×M×N first sensing lines SL1, where P is an integer greater than or equal to 2. Therefore, in regions between the first sensing electrodes TSC1 and the second sensing electrodes TSC2, the number of first sensing lines SL1 may increase as the first sensing lines SL1 become closer to the pad unit PDA. In the regions between the first sensing electrodes TSC1 and the second sensing electrodes TSC2, electromagnetic interference, e.g., noise caused by signals applied to the first sensing lines SL1 may increase as the number of first sensing lines SL1 increases. If the noise increases, the mutual capacitance between the first sensing electrode TSE1 and the second sensing electrode TSE2 may decrease. Therefore, the touch sensitivity of the electrode layer 220 may decrease as a distance to the pad unit PDA decreases in the electrode layer 220. Also, in the electrode layer 220, the touch sensitivity of a region distant from the pad unit PDA and the touch sensitivity of a region close to the pad unit PDA may be different from each other.

However, in some embodiments, sub-electrodes SUE1, SUE2, SUE3, and SUE4 of adjacent first sensing electrodes TSE1 may be electrically connected through the same first sensing lines SL1. That is, the sub-electrodes SUE1, SUE2, SUE3, and SUE4 of the adjacent first sensing electrodes TSE1 may share the first sensing lines SL1. Since the number of first sensing lines SL1 corresponding to the first sensing electrode column TSC1 is equal to that of sub-electrodes SUE1, SUE2, SUE3, and SUE4 included in each first sensing electrode TSE1, the number of first sensing lines SL1 corresponding to the first sensing electrode column TSC1 may be less than that of sub-electrodes SUE1, SUE2, SUE3, and SUE4 included in the first sensing electrode column TSC1. Thus, the number of first sensing lines SL1 disposed in the regions between the first sensing electrode columns TSC1 and the second sensing electrode columns TSC2 can decrease, and the area in which the first sensing lines SL1 are occupied in the regions between the first sensing electrode columns TSC1 and the second sensing electrode columns TSC2 can decrease.

In some embodiments, the number of first sensing lines SL1 disposed in the regions between the first sensing electrode columns TSC1 and the second sensing electrode columns TSC2 decreases, and, as such, electromagnetic interference between the second sensing electrodes TSE2 and the first sensing electrodes TSE1 and first sensing lines SL1 can decrease. Thus, the touch sensitivity of the electrode layer 220 can be improved.

In some embodiments, the number of first sensing lines SL1 disposed in the regions between the first sensing electrode columns TSC1 and the second sensing electrode columns TSC2 decreases, and, as such, the area in which the first sensing lines SL1 are occupied in the regions between the first sensing electrode columns TSC1 and the second sensing electrode columns TSC2 can decrease. Given that the area in which the first sensing lines SL1 are occupied in the regions between the first sensing electrode columns TSC1 and the second sensing electrode columns TSC2 decreases, the area of the first sensing electrodes TSE1 or the second sensing electrodes TSE2 can increase. By increasing the area of the first sensing electrodes TSE1 or the second sensing electrodes TSE2, the touch sensitivity of the electrode layer 220 can be improved.

The second sensing electrode columns TSC2 may include a plurality of second sensing electrodes TSE2. For example, one second sensing electrode column TSC2 may include q second sensing electrodes TES2, where q is an integer greater than or equal to 2. The second sensing electrodes TSE2 may be arranged in the direction in which the second sensing electrode columns TSC2 extend.

The second sensing electrodes TES2 may be connected to second sensing lines SL2, respectively. Therefore, the number of second sensing lines SL2 corresponding to one second sensing electrode column TSC2 may be equal to that of the second sensing electrodes TSE2. That is, the number of second sensing lines SL2 corresponding to the one second sensing electrode column TSC2 may be q. The second sensing lines SL2 may be disposed in the regions between the second sensing electrode columns TSC2 and the first sensing electrode columns TSC1.

The second sensing lines SL2 may be alternately disposed at left and right sides of the second sensing electrode columns TSC2. For example, the second sensing line SL2 connected to one of adjacent second sensing electrodes TSE2 may be disposed at the right side of the second sensing electrode column TSC2. In addition, the second sensing line SL2 connected to the other of the adjacent second sensing electrodes TSE2 may be disposed at the left side of the second sensing electrode column TSC2. Therefore, the numbers of second sensing lines SL2 disposed in the regions between the first sensing electrode columns TSC1 and the second sensing electrode columns TSC2 may be equal to one another.

In some embodiments, the first sensing lines SL1 connected to the sub-electrodes SUE1, SUE2, SUE3, and SUE4 disposed at the same positions in the first sensing electrode columns TSC1 may be electrically connected to each other through a first sensing line connection part CNL1. For example, the J-th first sensing lines SL1 connected to the J-th sub-electrodes of the first sensing electrodes TSE1 in one first sensing electrode column TSC1 may be electrically connected to the J-th first sensing lines SL1 connected to the J-th sub-electrodes of the first sensing electrodes TSE1 in another first sensing electrode column TSC1. Here, the other first sensing electrode column TSC1 may be a first sensing electrode column TSC1 that is not adjacent to the one first sensing electrode column TSC1, but is spaced apart from the one first sensing electrode column TSC1 the among the first sensing electrode columns TSC1.

For example, the electrode layer 220 may include the first sensing line connection part CNL1 provided on the first insulating layer 210 shown in FIG. 10, a second insulating layer 225 provided over the first sensing line connection part CNL1, and the first sensing electrodes TSE1, the second sensing electrodes TSE2, the first sensing lines SL1, and the second sensing lines SL2, which are provided on the second insulating layer 225.

The second insulating layer 225 may include at least one of an organic insulating material and an inorganic insulating material. The second insulating layer 225 may include a first contact hole CNT1 that exposes the first sensing line connection part CNL1 therethrough. The first sensing line connection part CNL1 and the first sensing lines SL1 may be electrically connected to each other through the first contact hole CNT1.

The first sensing lines SL1 connected to the first sensing line connection part CNL1 may be electrically connected to the same pad PD among the pads PD of the pad unit PDA. Thus, given that the first sensing lines SL1 are electrically connected to each other through the first sensing line connection part CNL1, the total number of pads PD electrically connected to the first sensing electrodes TSE1 may decrease.

In addition, since the J-th first sensing lines SL1 of the first sensing electrode columns TSC1 are electrically connected to each other, the J-th sub-electrodes connected to the J-th first sensing lines SL1 may be applied with the same signal, e.g., a touch driving signal, through the same pad PD. In addition or alternatively, the J-th sub-electrodes connected to the J-th first sensing lines SL1 may output the same signal, e.g., a touch sensing signal, through the same pad PD.

Although a case where the first sensing line connection parts CNL1 are provided in a lower layer of the first sensing electrodes TSE1, the second sensing electrodes TSE2, the first sensing lines SL1, and the second sensing lines SL2 is described and illustrated as an example, embodiments are not limited thereto. The first sensing line connection part CNL1 may be provided in an upper layer of the first sensing electrodes TSE1, the second sensing electrodes TSE2, the first sensing lines SL1, and the second sensing lines SL2.

The second sensing lines SL2 connected to second sensing electrodes TSE2 disposed at the same positions in the second sensing electrode columns TSC2 may be electrically connected to each other. For example, an i-th second sensing line SL2 connected to an i-th second sensing electrode TSE2 in each of four adjacent second sensing electrode columns TSC2 may be connected to a second sensing line connection part CNL2 through a second contact hole CNT2, where i is a positive integer less than or equal to q. Like the first sensing line connection part CNL1, the second sensing line connection part CNL2 may be provided on the first insulating layer 210. In addition, the connection structure of the second sensing lines SL2 and the second sensing line connection parts CNL2 may be identical to that of the first sensing lines SL1 and the first sensing line connection parts CNL1.

Since the i-th second sensing lines SL2 of the second sensing electrode columns TSC2 are electrically connected to each other, four second sensing electrodes TSE2 connected to the i-th second sensing lines SL2 in four adjacent second sensing electrode columns TSC2 may be electrically connected to each other.

According to some embodiments, the second sensing lines SL2 connected to second sensing electrodes TSE2 disposed at the same positions in the second sensing electrode columns TSC2 may be electrically connected to the same pad PD among the pads PD of the pad unit PDA. Since the i-th second sensing lines SL2 are electrically connected to each other, the i-th second sensing electrodes TSE2 connected to the i-th second sensing lines SL2 may be applied with the same signal, e.g., a touch driving signal, through the same pad PD. In addition or alternatively, the i-th second sensing electrodes TSE2 connected to the i-th second sensing lines SL2 may output the same signal, e.g., a touch sensing signal, through the same pad PD.

Since the second sensing lines SL2 connected to second sensing electrodes TSE2 disposed at the same positions in the second sensing electrode columns TSC2 are electrically connected to each other, the number of pads PD electrically connected to the second sensing electrodes TSE2 may decrease.

Although a case where the second sensing electrodes TSE2 disposed at the same positions in four adjacent second sensing electrode columns TSC2 are connected to one pad PD is described and illustrated as an example, embodiments are not limited thereto. For example, the second sensing electrodes TSE2 disposed at the same positions in two or three adjacent second sensing electrode columns TSC2 may be connected to one pad PD.

According to some embodiments, the sub-electrodes SUE1, SUE2, SUE3, and SUE4 and the second sensing electrodes TSE2, as shown in FIG. 11, may include a plurality of conductive fine lines CFL. For example, the sub-electrodes SUE1, SUE2, SUE3, and SUE4 and the second sensing electrodes TSE2 may include a plurality of first conductive fine lines CFL1 that extend in one direction and are parallel to one another, and a plurality of second conductive fine lines CFL2 that extend in a direction intersecting the first conductive fine lines CFL1 and are parallel to one another. That is, the second sensing electrodes TSE2 and the sub-electrodes SUE1, SUE2, SUE3, and SUE4 may have a mesh structure.

The mesh structure may include a plurality of openings, e.g., regions formed as the first conductive fine lines CFL1 and the second conductive fine lines CFL2 intersect each other. The openings can decrease the area in which the sub-electrodes SUE1, SUE2, SUE3, and SUE4 and the second sensing electrodes TSE2 overlap with the display panel 100. By reducing the area in which the sub-electrodes SUE1, SUE2, SUE3, and SUE4 and the second sensing electrodes TSE2 overlap with the display panel 100, it is possible to prevent (or at least reduce) electromagnetic interference between the sub-electrodes SUE1, SUE2, SUE3, and SUE4 and second sensing electrodes TSE2 and the display panel 100. Thus, the touch sensitivity of the electrode layer 220 can be improved. In addition, by reducing the area in which the sub-electrodes SUE1, SUE2, SUE3, and SUE4 and the second sensing electrodes TSE2 overlap with the display panel 100, the number of obstacles on (or in) a path along which light emitted from the display panel 100 is transferred to a viewer can be reduced. Thus, the display quality of the display device including the touch sensor 200 and the display panel 100 can be improved.

The first conductive fine lines CFL1 and the second conductive fine lines CFL2 may include at least one of aluminum (Al), copper (Cu), chromium (Cr), nickel (Ni), gold (Au), platinum (Pt), and any alloy thereof. Also, the first conductive fine lines CFL1 and the second conductive fine lines CFL2 may include a transparent conductive oxide.

Although a case where the first sensing electrodes TSE1 and the second sensing electrodes TSE2 are provided on the second insulating layer 225 is described and illustrated as an example, embodiments are not limited thereto. For example, the first conductive fine lines CFL1 and the second conductive fine lines CFL2, which are included in the first sensing electrodes TSE1 and the second sensing electrodes TSE2, may include a first conductive layer provided on the first insulating layer 210 and a second conductive layer provided on the second insulating layer 225, and the first conductive layer and the second conductive layer may be electrically connected to each other through a contact hole.

Figure 12:
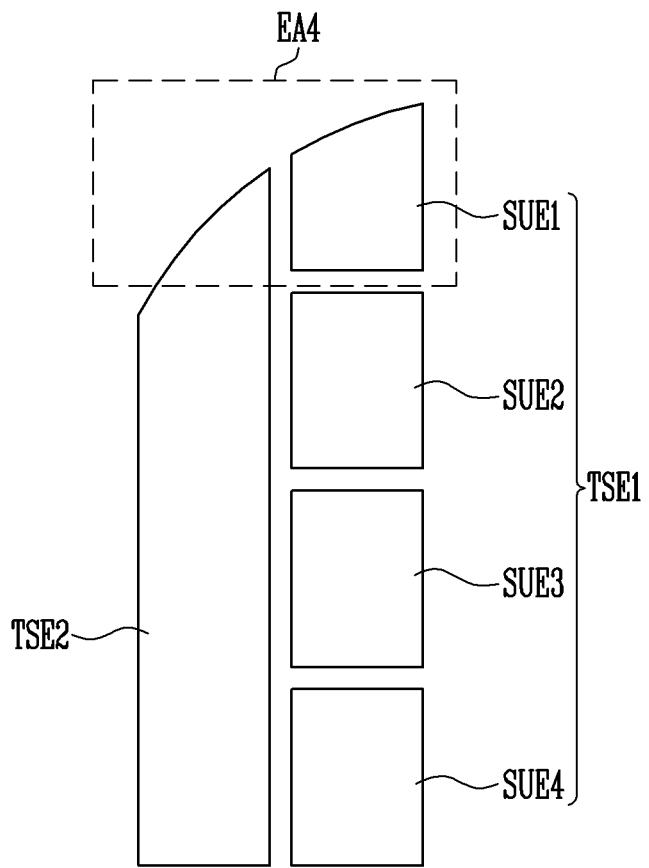
FIG. 12 is a plan view illustrating a first sensing electrode and a second sensing electrode that are provided at a rounded corner of the touch sensor shown in FIG. 5 according to some exemplary embodiments.
Figure 13:
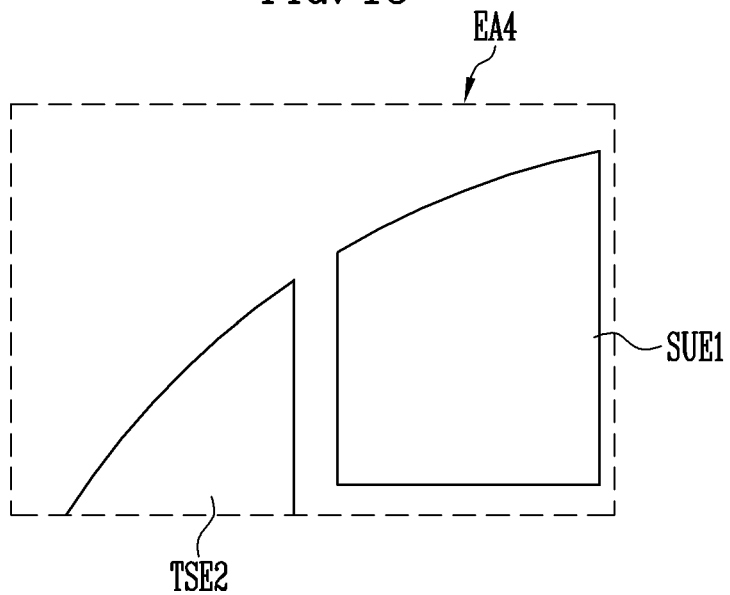
FIG. 13 is an enlarged view of region EA4 of FIG. 12 according to some exemplary embodiments.
Figure 14:
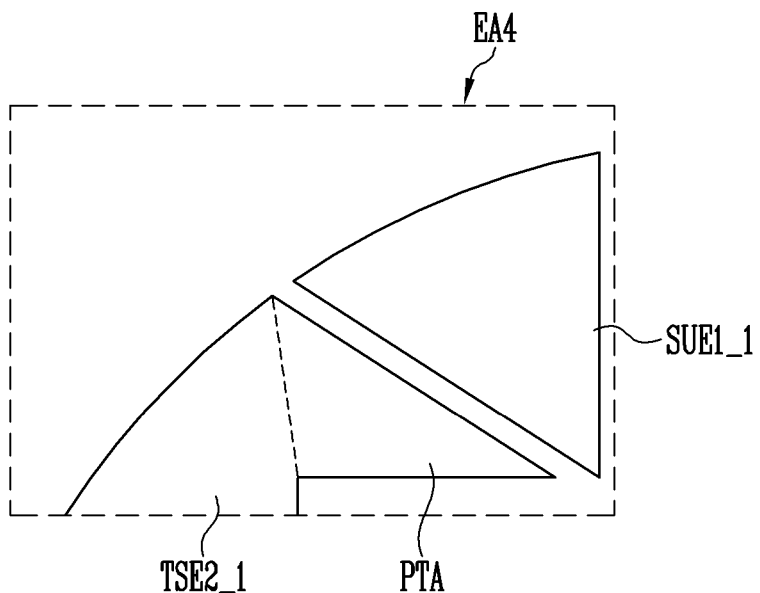
FIGS. 14 and 15 are plan views illustrating examples of a first sensing electrode and a second sensing electrode that are provided at a rounded corner of a touch sensor according to various exemplary embodiments.
Figure 15:
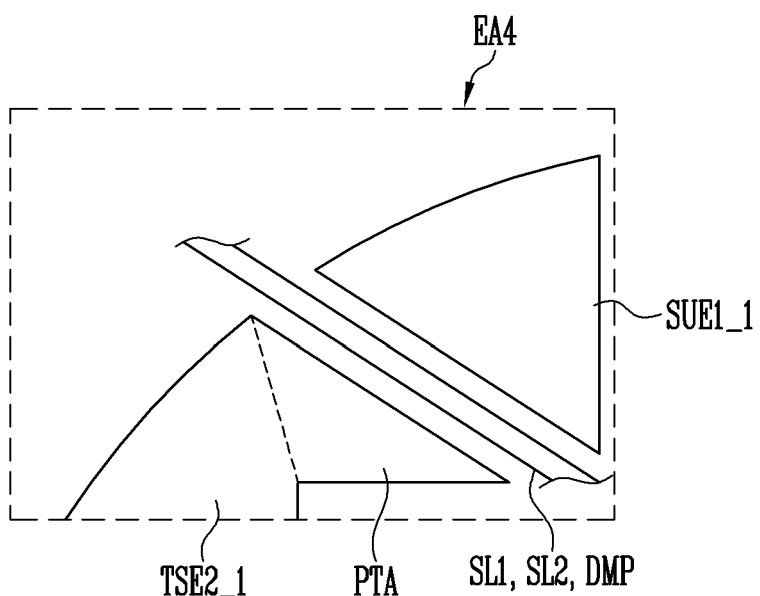

FIG. 12 is a plan view illustrating a first sensing electrode and a second sensing electrode that are provided at a rounded corner of the touch sensor shown in FIG. 5 according to some exemplary embodiments. FIG. 13 is an enlarged view of region EA4 of FIG. 12 according to some exemplary embodiments. FIGS. 14 and 15 are plan views illustrating examples of a first sensing electrode and a second sensing electrode that are provided at a rounded corner of a touch sensor according to various exemplary embodiments. The plan views of FIGS. 14 and 15 illustrate similar regions as region EA4, but with respect to modified touch sensors. As such, primarily differences will be described below to avoid obscuring exemplary embodiments.

Referring to FIGS. 12 to 15, the touch sensor 200 (see FIGS. 1 to 11) may have a closed polygonal shape including linear sides, and at least some corners of the polygonal shape may be formed in a curve. That is, the touch sensor 200 may have rounded corners. For example, when the touch sensor 200 has a rectangular shape, a portion at which adjacent linear sides meet each other may be replaced with a curve having a determined curvature. That is, the corner of the rectangular shape may be formed with a curved side having both adjacent ends respectively connected to two adjacent linear sides, the curved side having a determined curvature.

The touch sensor 200 may include a sensing region SA and a non-sensing region NSA provided at the periphery of the sensing region SA. The sensing region SA may have a shape corresponding to that of the touch sensor 200. For example, the sensing region SA may have a rectangular shape, and a corner of the rectangular shape may be formed with a curved side having both adjacent ends respectively connected to two adjacent linear sides, the curved side having a determined curvature.

A plurality of first sensing electrode columns TSC1 and a plurality of second sensing electrode columns TSC2 alternately disposed with the first sensing electrode columns TSC1 may be provided in the sensing region SA.

The first sensing electrode columns TSC1 and the second sensing electrode columns TSC2 may include a plurality of first sensing electrodes TSE1 and a plurality of second sensing electrodes TSE2 or TSE2_1. For example, one first sensing electrode column TSC1 and one second sensing electrode column TSC2 may include M first sensing electrodes TSE1 and M second sensing electrodes TSE2 or TSE2_1, M is an integer greater than or equal to 2. The first sensing electrodes TSE1 and the second sensing electrodes TSE2 or TSE_2 may be arranged in the direction in which the first sensing electrode columns TSC1 and the second sensing electrode columns TSC2 extend.

Each of the first sensing electrodes TSE1 may include a plural number of sub-electrodes, e.g., N (N is a natural number of 2 or more) sub-electrodes SUE1 (or SUE1_1), SUE2, SUE3, and SUE4 disposed to be spaced apart from each other. For example, each of the first sensing electrodes TSE1 may include first to fourth sub-electrodes SUE1 (or SUE1_1), SUE2, SUE3, and SUE4. The first to fourth sub-electrodes SUE1 (or SUE1_1), SUE2, SUE3, and SUE4 may be sequentially arranged in the extending direction of the first sensing electrode columns TSC1.

The sub-electrodes SUE1 (or SUE1_1), SUE2, SUE3, and SUE4 may be connected to first sensing lines SL1. In addition, the sub-electrodes SUE1, SUE2, SUE3, and SUE4 of one of adjacent first sensing electrodes TSE1 may be electrically connected to the sub-electrodes SUE1, SUE2, SUE3, and SUE4 of the other of the adjacent first sensing electrodes TSE1 through the first sensing lines SL1, respectively.

The second sensing electrodes TSE2 (or TSE2_1) may be connected to second sensing lines SL2.

Since the sensing region SA has a rounded corner, edges of the first sub-electrode SUE1 (or SUE1_1) and the second sensing electrode TSE2 (or TSE2_1), which correspond to the rounded corner, may have a rounded shape. That is, the first sub-electrode SUE1 (or SUE1_1) and the second sensing electrode TSE2 (or TSE2_1) may have a shape in which a portion of a quadrangular shape, e.g., a region at the outside of a curved side, is removed. Therefore, the area of the first sub-electrode SUE1 (or SUE1_1) may be smaller than those of the other sub-electrodes, e.g., the second to fourth sub-electrodes SUE2, SUE3, and SUE4. In addition, the sum of the areas of the first to fourth sub-electrodes SUE1 (or SUE1_1), SUE2, SUE3, and SUE4 of the first sensing electrode TSE1 may be different from the area of the second sensing electrode TSE2 or TSE2_1.

As shown in FIG. 13, the first sub-electrode SUE1 and the second sensing electrode TSE2 have a shape having a portion removed therefrom, and, as such, the capacitance of a capacitor formed between the first sub-electrode SUE1 and the second sensing electrode TSE2 may decrease. This is because the areas of the first sub-electrode SUE1 and the second sensing electrode TSE2 are smaller. In some embodiments, a decrease in area of the second sensing electrode TSE2 is larger than that in area of the first sub-electrode SUE1, and, therefore, the capacitance of the capacitor formed between the first sub-electrode SUE1 and the second sensing electrode TSE2 may decrease in proportion to the decrease in area of the second sensing electrode TSE2. As the capacitance decreases, the touch sensitivity of the touch sensor 200 may be deteriorated.

Meanwhile, as shown in FIGS. 14 and 15, the second sensing electrode TSE2_1 has a shape protruding to the first sub-electrode SUE1_1 such that the area of the first sub-electrode SUE1_1 may decrease, but the area of the second sensing electrode TSE2_1 may increase. Therefore, the sum of the areas of the first to fourth sub-electrodes SUE1_1, SUE2, SUE3, and SUE4 of the first sensing electrode TSE1 may be substantially the same as or similar to the area of the second sensing electrode TSE2_1.

At least because the second sensing electrode TSE2_1 has a shape protruding towards the first sub-electrode SUE1_1, the area in which the first sub-electrode SUE1_1 and the second sensing electrode TSE2_1 can form a capacitor may increase. As the area in which the first sub-electrode SUE1_1 and the second sensing electrode TSE2_1 form the capacitor increases, the capacitance of the capacitor may increase. As the capacitance increases, the touch sensitivity of the touch sensor 200 can be improved.

Hereinafter, the first sub-electrode SUE1_1 and the second sensing electrode TSE2_1, which are provided at the rounded corner of the touch sensor shown in FIGS. 14 and 15 will be described in more detail.

The edges of the first sub-electrode SUE1_1 and the second sensing electrode TSE2_1, which are provided at the rounded corner of the sensing region SA in the touch sensor 200, may have a rounded shape, corresponding to the rounded corner of the sensing region SA.

In addition, the second sensing electrode TSE2_1 may include a protrusion part PTA protruding in a direction perpendicular or inclined with respect to the direction in which the second sensing electrode columns TSC2 extend. The protrusion part PTA may protrude toward the first sub-electrode SUE1_1 of the first sensing electrode TSE1. Here, by the protrusion part PTA, the boundary between the first sub-electrode SUE1_1 and the second sensing electrode TSE2_1 may be inclined in the direction in which the first sensing electrode columns TSC1 and the second sensing electrode columns TSC2 extend. In addition, the protrusion part PTA may extend to the inside of the first sensing electrode column TSC1. For instance, the protrusion part PTA may extend into a notched, concave, or otherwise patterned portion of the first sub-electrode SUE1_1.

If the protruding part PTA extends to the inside of the first sensing electrode column TSC1, the area of the second sensing electrode TSE2_1 provided at the rounded corner of the sensing region SA may increase due to the protrusion part PTA. However, the area of the first sub-electrode SUE1_1 may decrease due to the protrusion part PTA. For example, the area of the first sub-electrode SUE1_1 may decrease in proportion to the area of the protrusion part PTA protruding toward the first sensing electrode TSE1. Therefore, the sum of the areas of the first to fourth sub-electrodes SUE1_1, SUE2, SUE3, and SUE4 of the first sensing electrode TSE1 may be equal or similar to the area of the second sensing electrode TSE2_1.

In addition, although the area of the first sub-electrode SUE1_1 decreases, the area of the second sensing electrode TSE2_1 increases, and, as such, the area in which the first sub-electrode SUE1_1 and the second sensing electrode TSE2_1 form a capacitor may increase. Therefore, the capacitance of the capacitor formed between the first sub-electrode SUE1_1 and the second sensing electrode TSE2_1 may increase.

At least one of the first sensing lines SL1 connected to the sub-electrodes SUE1_1, SUE2, SUE3, and SUE4 and the second sensing lines SL2 connected to the second sensing electrode TSE2_1 may be provided between the protrusion part PTA of the second sensing electrode TSE2_1 and the first sub-electrode SUE1_1. In addition, a dummy pattern DMP may be provided between the protrusion part PTA of the second sensing electrode TSE2_1 and the first sub-electrode SUE1_1. The dummy pattern DMP may prevent (or at least reduce) a region between the first sub-electrode SUE1_1 and the second sensing electrode TSE2_1 from being viewed by a user.

At the rounded corner, the touch sensor 200 shown in FIG. 14 may not include the first sensing lines SL1, the second sensing lines SL2, and the dummy pattern DMP between the protrusion part PTA of the second sensing electrode TSE2_1 and the first sub-electrode SUE1_1. Therefore, at the rounded corner, the touch sensor 200 shown in FIG. 14 may increase the area of the second sensing electrode TSE2_1 and the area of the first sub-electrode SUE1_1, and decrease the distance between the protrusion part PTA of the second sensing electrode TSE2_1 and the first sub-electrode SUE1_1.

As the area of the second sensing electrode TSE2_1 and the area of the first sub-electrode SUE1_1 increase, and the distance between the protrusion part PTA of the second sensing electrode TSE2_1 and the first sub-electrode SUE1_1 decreases, the touch sensitivity of the touch sensor 200 can be improved. That is, at the rounded corner, the touch sensitivity of the touch sensor 200 shown in FIG. 14 can be better than the touch sensitivity of the touch sensor 200 shown in FIG. 15.

FIGS. 16, 17, 18, and 19 are plan views illustrating examples of a first sensing electrode and a second sensing electrode that are provided at a rounded corner of a touch sensor according to various exemplary embodiments. The plan views of FIGS. 16 to 19 illustrate similar regions as region EA4, but with respect to modified touch sensors. As such, primarily differences will be described below to avoid obscuring exemplary embodiments.

Referring to FIGS. 16 to 19, the sensing region SA of the touch sensor 200 (see FIGS. 1 to 11) may have a rounded corner.

A plurality of first sensing electrode columns TSC1 and a plurality of second sensing electrode columns TSC2 alternately disposed with the first sensing electrode columns TSC1 may be provided in the sensing region SA. The first sensing electrode columns TSC1 and the second sensing electrode columns TSC2 may include a plurality of first sensing electrodes TSE1 and a plurality of second sensing electrodes TSE2_2 or TSE2_3.

Each of the first sensing electrodes TSE1 may include first to fourth sub-electrodes SUE1_2 (or SUE1_3), SUE2, SUE3, and SUE4 that are sequentially disposed to be spaced apart from each other. The sub-electrodes SUE1_2 (or SUE1_3), SUE2, SUE3, and SUE4 may be connected to first sensing lines SL1_1 or SL1_2. In addition, the sub-electrodes SUE1_2 (or SUE1_3), SUE2, SUE3, and SUE4 of one of adjacent first sensing electrodes TSE1 may be electrically connected to the sub-electrodes SUE1_2 (or SUE1_3), SUE2, SUE3, and SUE4 of the other of the adjacent first sensing electrodes TSE1 through the first sensing lines SL1_1 or SL1_2, respectively.

The second sensing electrodes TSE2_2 or TSE2_3 may be connected to second sensing lines SL2_1 or SL2_2.

Edges of the first sub-electrode SUE1_2 or SUE1_3 and the second sensing electrode TSE2_2 or TSE2_3, which are provided at the rounded corner of the sensing region SA, may have a shape corresponding to that of the rounded shape of the sensing region SA.

Figure 16:
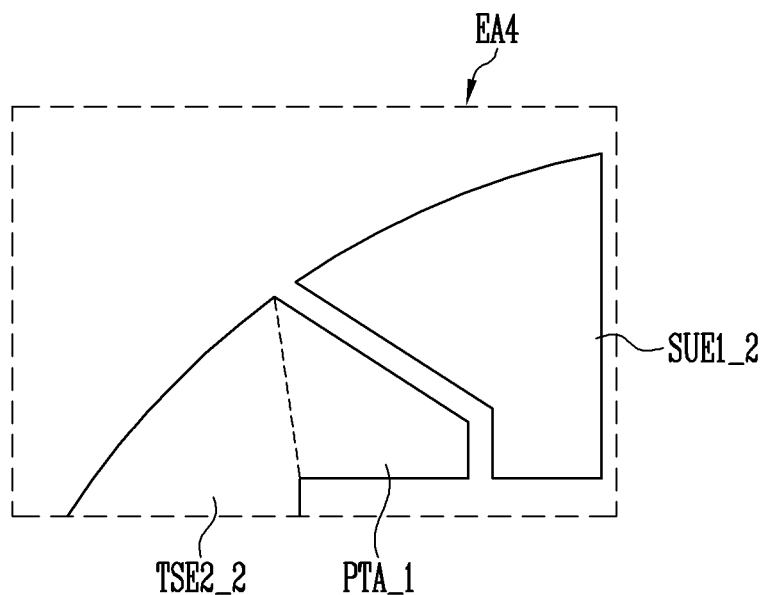
FIGS. 16, 17, 18, and 19 are plan views illustrating examples of a first sensing electrode and a second sensing electrode that are provided at a rounded corner of a touch sensor according to various exemplary embodiments.
Figure 17:
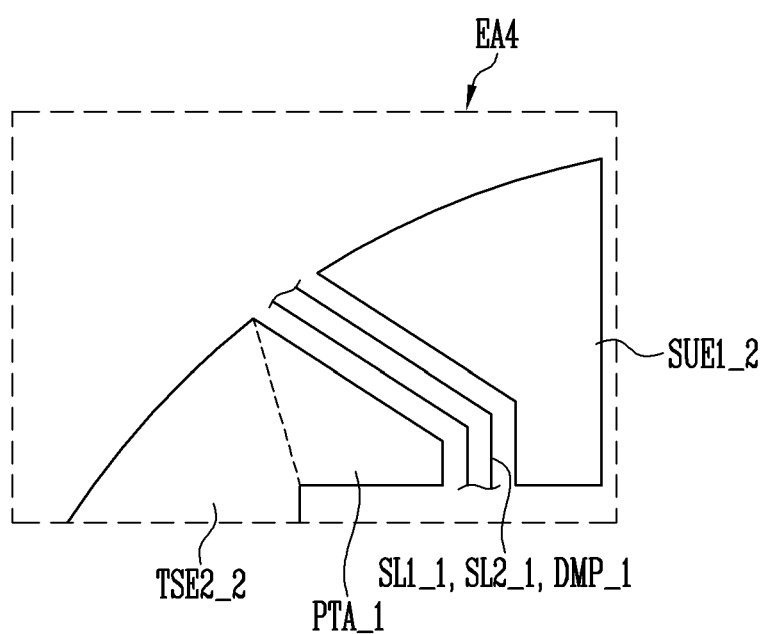
Figure 18:
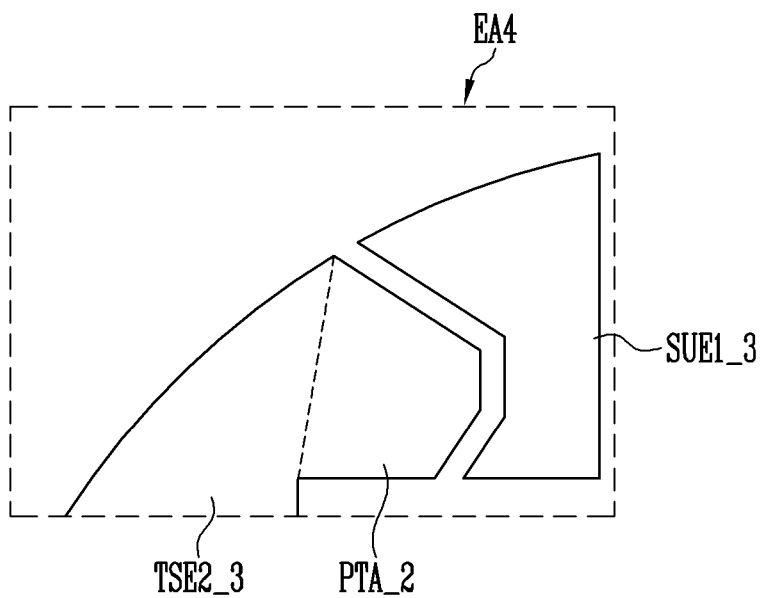
Figure 19:
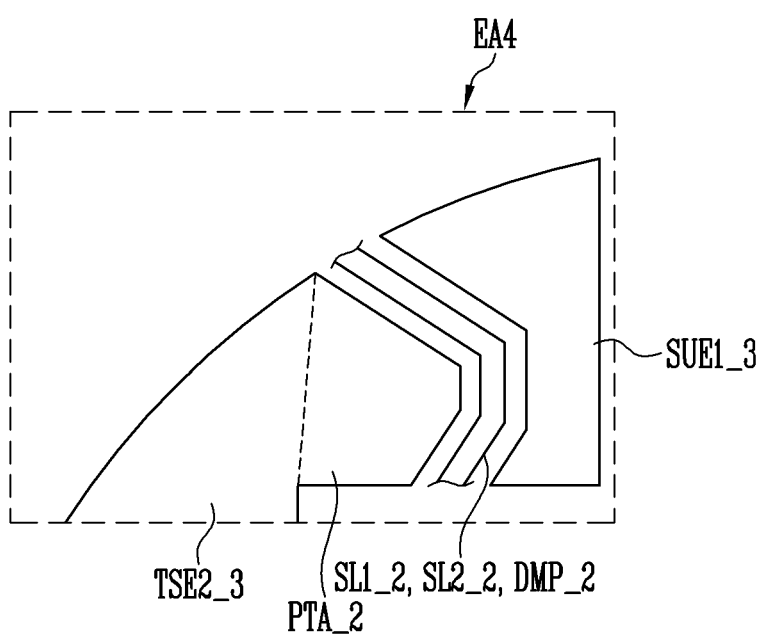

In addition, the second sensing electrode TSE2_2 or TSE2_3 may include a protrusion part PTA_1 or PTA_2 protruding in a direction perpendicular or inclined with respect to the direction in which the second sensing electrode columns TSC2 extend. The protrusion part PTA_1 or PTA_2 may protrude toward the first sub-electrode SUE1_2 or SUE1_3 of the first sensing electrode TSE1. Here, by the protrusion part PTA_1 or PTA_2, a portion of the boundary between the first sub-electrode SUE1_2 or SUE1_3 and the second sensing electrode TSE2_2 or TSE2_3 may be inclined in the direction in which the first sensing electrode columns TSC1 and the second sensing electrode columns TSC2 extend. In addition, the boundary may have at least one bending point. As shown in FIGS. 16 and 17, the boundary between the first sub-electrode SUE1_2 and the second sensing electrode TSE2_2 may have one bending point. As shown in FIGS. 18 and 19, the boundary between the first sub-electrode SUE1_3 and the second sensing electrode TSE2_3 may have two bending points.

The length of the boundary between the first sub-electrode SUE1_2 or SUE1_3 and the second sensing electrode TSE2_2 or TSE2_3 may be increased by the bending point. In addition, the capacitance of a capacitor formed between the first sub-electrode SUE1_2 or SUE1_3 and the second sensing electrode TSE2_2 or TSE2_3 may be in proportion to the length of the boundary between the first sub-electrode SUE1_2 or SUE1_3 and the second sensing electrode TSE2_2 or TSE2_3. Therefore, as the length of the boundary between the first sub-electrode SUE1_2 or SUE1_3 and the second sensing electrode TSE2_2 or TSE_3 increases, the capacitance may be increased. As the capacitance of the capacitor formed between the first sub-electrode SUE1_2 or SUE1_3 and the second sensing electrode TSE2_2 or TSE2_3 increases, the touch sensitivity at the rounded corner of the touch sensor 200 can be improved.

At least one of the first sensing lines SL1_1 or SL1_2 connected to the sub-electrodes SUE1_2 (or SUE1_3), SUE2, SUE3, and SUE4 and the second sensing lines SL2_1 or SL2_2 connected to the second sensing electrode TSE2_2 or TSE2_3 may be provided between the protrusion part PTA_1 or PTA_2 of the second sensing electrode TSE2_2 or TSE2_3 and the first sub-electrode SUE1_2 or SUE1_3. In addition, a dummy pattern DMP_1 or DMP_2 may be provided between the protrusion part PTA_1 or PTA_2 of the second sensing electrode TSE2_2 or TSE2_3 and the first sub-electrode SUE1_2 or SUE1_3.

At the rounded corner, the touch sensor 200 shown in FIGS. 16 and 18 may not include the first sensing lines SL1_1 or SL1_2, the second sensing lines SL2_1 or SL2_2, and the dummy pattern DMP_1 or DMP_2 between the protrusion part PTA_1 or PTA_2 of the second sensing electrode TES2_2 or TSE_3 and the first sub-electrode SUE1_2 or SUE_3. As such, at the rounded corner, the touch sensor 200 shown in FIGS. 16 and 18 may increase the area of the second sensing electrode TSE2_2 or TSE2_3 and the area of the first sub-electrode SUE1_2 or SUE1_3, and decrease the distance between the protrusion part PTA_1 or PTA_2 of the second sensing electrode TSE2_2 or TSE2_3 and the first sub-electrode SUE1_2 or SUE1_3.

As the area of the second sensing electrode TSE2_2 or TSE2_3 and the area of the first sub-electrode SUE1_2 or SUE1_3 increase, and the distance between the protrusion part PTA_1 or PTA_2 of the second sensing electrode TSE2_2 or TSE2_3 and the first sub-electrode SUE1_2 or SUE1_3 decreases, the touch sensitivity of the touch sensor 200 can be improved. That is, at the rounded corner, the touch sensitivity of the touch sensor 200 shown in FIGS. 16 and 18 can be better than as compared with the touch sensitivity of the touch sensor 200 shown in FIGS. 17 and 19.

FIGS. 20, 21, 22, and 23 are plan views illustrating a first sensing electrode and a second sensing electrode that are provided at a rounded corner of a touch sensor according to various exemplary embodiments. The plan views of FIGS. 20 to 23 illustrate similar regions as region EA4, but with respect to modified touch sensors. As such, primarily differences will be described below to avoid obscuring exemplary embodiments.

Referring to FIGS. 20 to 23, the sensing region SA of the touch sensor 200 (see FIGS. 1 to 11) may have a rounded corner. A plurality of first sensing electrode columns TSC1 and a plurality of second sensing electrode columns TSC2 alternately disposed with the first sensing electrode columns TSC1 may be provided in the sensing region SA. The first sensing electrode columns TSC1 and the second sensing electrode columns TSC2 may include a plurality of first sensing electrodes TSE1 and a plurality of second sensing electrodes TSE2.

Each of the first sensing electrodes TSE1 may include first to fourth sub-electrodes SUE1_4 (or SUE1_5), SUE2, SUE3, and SUE4 that are sequentially disposed to be spaced apart from each other. The sub-electrodes SUE1_4 (or SUE1_5), SUE2, SUE3, and SUE4 may be connected to first sensing lines SL1_3 or SL1_4. In addition, the sub-electrodes SUE1_4 (or SUE1_5), SUE2, SUE3, and SUE4 of one of adjacent first sensing electrodes TSE1 may be electrically connected to the sub-electrodes SUE1_4 (or SUE1_5), SUE2, SUE3, and SUE4 of the other of the adjacent first sensing electrodes TSE1 through the first sensing lines SL1_3 or SL1_4, respectively.

The second sensing electrodes TSE2_4 or TSE2_5 may be connected to second sensing lines SL2_3 or SL2_4.

Edges of the first sub-electrode SUE1_4 or SUE1_5 and the second sensing electrode TSE2_4 or TSE2_5, which are provided at the rounded corner of the sensing region SA, may have a shape corresponding to that of the rounded shape of the sensing region SA. That is, the edges of the first sub-electrode SUE1_4 or SUE1_5 and the second sensing electrode TSE2_4 or TSE2_5, which correspond to the rounded corner of the sensing region SA, may have a rounded shape. In addition, the second sensing electrode TSE2_4 or TSE2_5 may include a protrusion part PTA_3 or PTA_4 protruding in a direction perpendicular or inclined with respect to the direction in which the second sensing electrode columns TSC2 extend. The protrusion part PTA_3 or PTA_4 may protrude toward the first sub-electrode SUE1_4 or SUE_5 of the first sensing electrode TSE1. The protrusion part PTA_3 or PTA_4 may be more adjacent to the rounded corner than the first sub-electrode SUE1_4 or SUE1_5 having the rounded edge.

Figure 20:
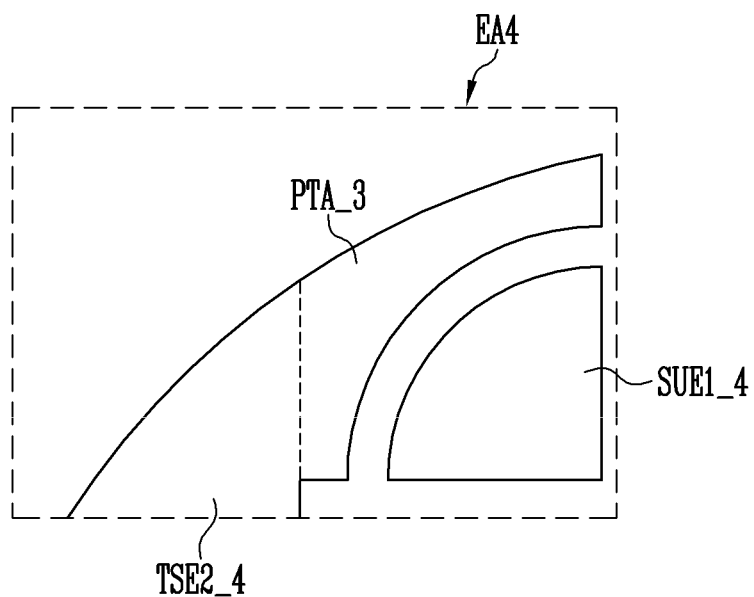
FIGS. 20, 21, 22, and 23 are plan views illustrating a first sensing electrode and a second sensing electrode that are provided at a rounded corner of a touch sensor according to various exemplary embodiments.
Figure 21:
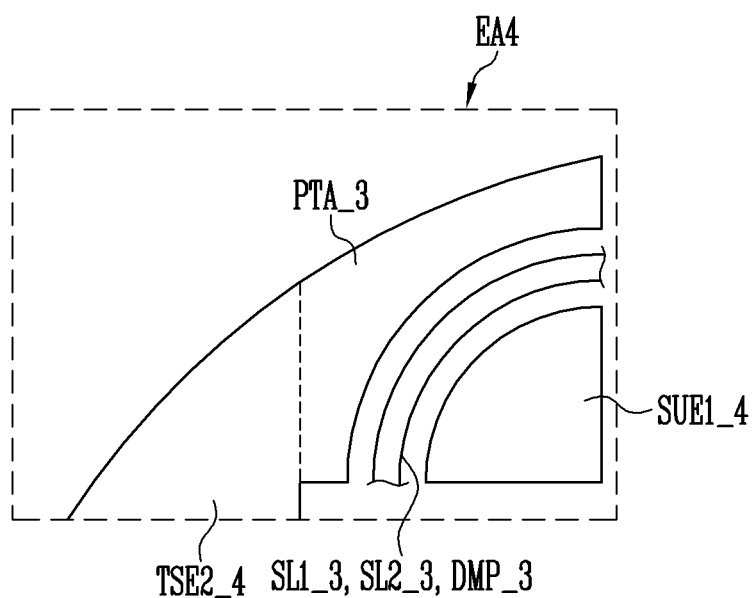
Figure 22:
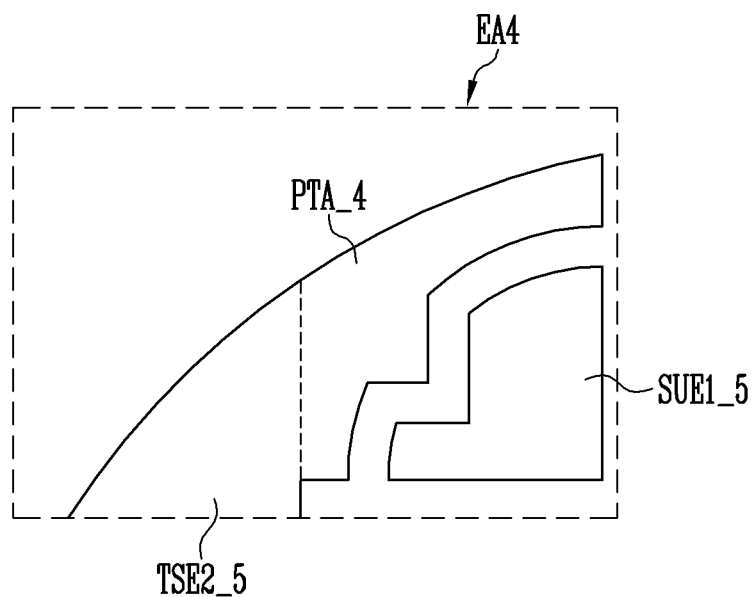
Figure 23:
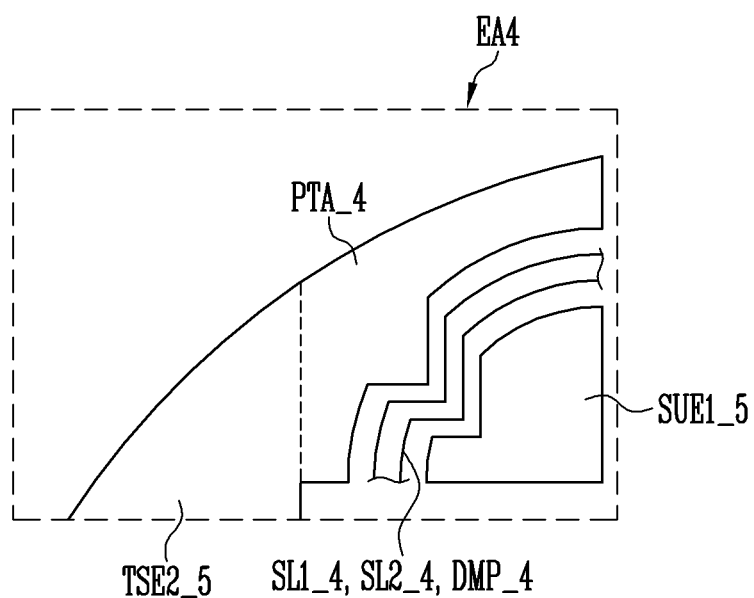

At least a portion of the boundary between the first sub-electrode SUE1_4 or SUE1_5 and the second sensing electrode TSE2_4 or TSE2_5 may have a curved shape. For example, as shown in FIGS. 20 and 21, the boundary between the protrusion part PTA_3 of the second sensing electrode TSE2_4 and the first sub-electrode SUE1_4 may have a curved shape. In addition, as shown in FIGS. 22 and 23, the boundary between the protrusion part PTA_4 and the second sensing electrode TSE2_5 may have a shape including curves at both ends thereof and a connection line (or portion) that connects the curves between the curves at both the ends thereof. The connection line may be formed in the shape of a bent line having at least one bending point.

In some embodiments, at least a portion of the boundary between the first sub-electrode SUE1_4 or SUE1_5 and the second sensing electrode TSE2_4 or TSE2_5 has a curved shape, and, as such, the length of the boundary between the first sub-electrode SUE1_4 or SUE1_5 and the second sensing electrode TSE2_4 or TSE2_5 may increase. As the length of the boundary between the first sub-electrode SUE1_4 or SUE1_5 and the second sensing electrode TSE2_4 or TSE2_5 increases, the capacitance of a capacitor formed between the first sub-electrode SUE1_4 or SUE1_5 and the second sensing electrode TSE2_4 or TSE2_5 may increase. As the capacitance of the capacitor formed between the first sub-electrode SUE1_4 or SUE1_5 and the second sensing electrode TSE2_4 or TSE2_5 increases, the touch sensitivity in a region adjacent to the rounded corner of the touch sensor 200 can be improved.

At least one of the first sensing lines SL1_3 or SL1_4 connected to the sub-electrodes SUE1_4 (or SUE1_5), SUE2, SUE3, and SUE4 and the second sensing lines SL2_3 or SL2_4 connected to the second sensing electrode TSE2_4 or TSE2_5 may be provided between the protrusion part PTA_3 or PTA_4 of the second sensing electrode TSE2_4 or TSE2_5 and the first sub-electrode SUE1_4 or SUE1_5. In addition, a dummy pattern DMP_3 or DMP_4 may be provided between the protrusion part PTA_3 or PTA_4 of the second sensing electrode TSE2_4 or TSE2_5 and the first sub-electrode SUE1_4 or SUE1_5.

At the rounded corner, the touch sensor 200 shown in FIGS. 20 and 22 may not include the first sensing lines SL1_3 or SL1_4, the second sensing lines SL2_3 or SL2_4, and the dummy pattern DMP_3 or DMP_4 between the protrusion part PTA_3 or PTA_4 of the second sensing electrode TES2_4 or TES2_5 and the first sub-electrode SUE1_4 or SUE1_5. Therefore, at the rounded corner, the touch sensor 200 shown in FIGS. 20 and 22 may increase the area of the second sensing electrode TSE2_4 or TSE2_5 and the area of the first sub-electrode SUE1_4 or SUE1_5, and decrease the distance between the protrusion part PTA_3 or PTA_4 of the second sensing electrode TSE2_4 or TSE2_5 and the first sub-electrode SUE1_4 or SUE1_5.

As the area of the second sensing electrode TSE2_4 or TSE2_5 and the area of the first sub-electrode SUE1_4 or SUE1_5 increases, and the distance between the protrusion part PTA_3 or PTA_4 of the second sensing electrode TSE2_4 or TSE2_5 and the first sub-electrode SUE1_4 or SUE1_5 decreases, the touch sensitivity of the touch sensor 200 can be improved. That is, at the rounded corner, the touch sensitivity of the touch sensor 200 shown in FIGS. 20 and 22 can be better than as compared with the touch sensitivity of the touch sensor 200 shown in FIGS. 21 and 23.

Figure 24:
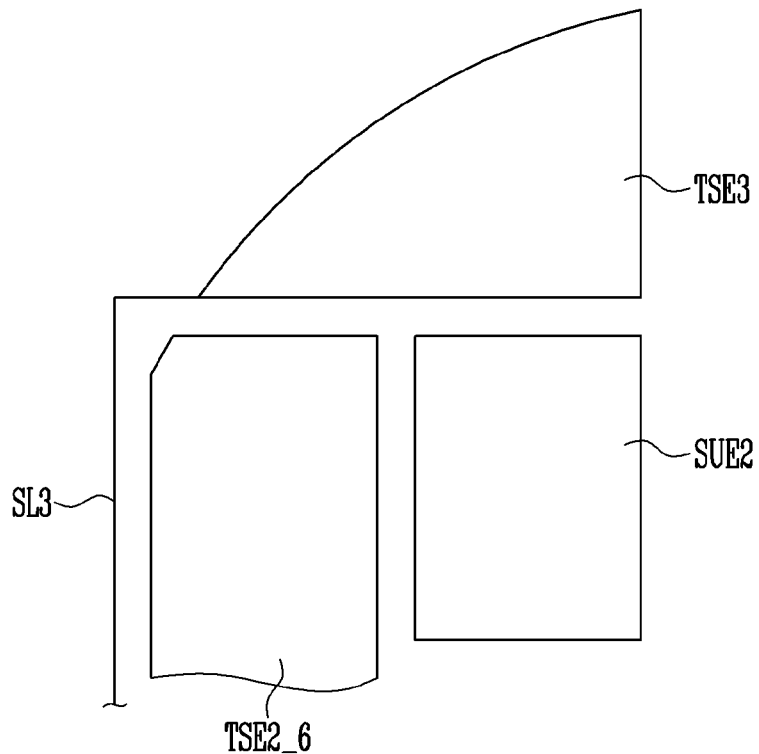
FIGS. 24 and 25 are plan views illustrating a first sensing electrode and a second sensing electrode that are provided at a rounded corner of a touch sensor according to some exemplary embodiments.
Figure 25:
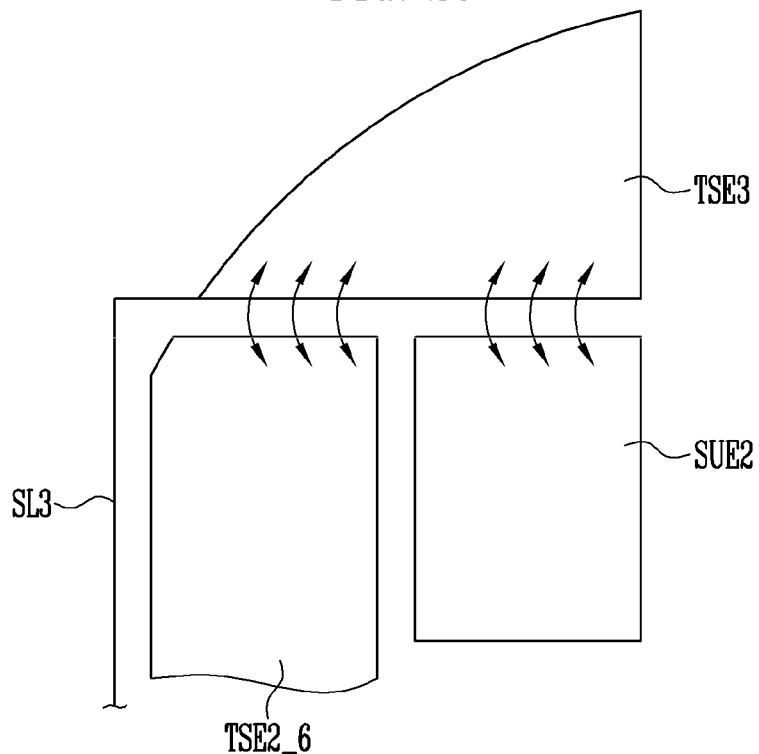

FIGS. 24 and 25 are plan views illustrating a first sensing electrode and a second sensing electrode that are provided at a rounded corner of a touch sensor according to some exemplary embodiments. The touch sensor of FIGS. 24 and 25 is similar to the touch sensor 200 of FIGS. 1 to 11. As such, primarily differences will be described below to avoid obscuring exemplary embodiments.

Referring to FIGS. 24 and 25, the sensing region SA of the touch sensor 200 (see FIGS. 1 to 11) may have a rounded corner. A plurality of first sensing electrode columns TSC1 and a plurality of second sensing electrode columns TSC2 alternately disposed with the first sensing electrode columns TSC1 may be provided in the sensing region SA. The first sensing electrode columns TSC1 and the second sensing electrode columns TSC2 may include a plurality of first sensing electrodes TSE1 and a plurality of second sensing electrodes TSE2_6.

Some of the first sensing electrodes TSE1 may include first to fourth sub-electrodes SUE1, SUE2, SUE3, and SUE4 that are sequentially disposed to be spaced apart from each other. The first sub-electrode SUE1 of the first sensing electrode TSE1 provided at (or near) the rounded corner and a region of the second sensing electrode TSE2_6 corresponding to the first sensing electrode SUE1 at (or near) may be omitted. That is, the first sensing electrode TSE1 provided at the rounded corner may include only the second to fourth sub-electrodes SUE2, SUE3, and SUE4. In this manner, a third sensing electrode TSE3 may be provided in the region in which the first sub-electrode SUE1 and the region of the second sensing electrode TSE2_6 corresponding to the first sub-electrode SUE1 are omitted. That is, the third sensing electrode TSE3 may be provided at the rounded corner. In addition, an edge corresponding to the rounded corner of the third sensing electrode TSE3 may have a rounded shape.

The third sensing electrode TSE3 may be a self-capacitance type sensing electrode. For example, as shown in FIG. 24, the third sensing electrode TSE3 may not form a capacitor with the first sensing electrode TSE1 and the second sensing electrode TSE2_6.

In some embodiments, as shown in FIG. 25, the third sensing electrode TSE3 may form a capacitor with at least one of the first sensing electrode TSE1 and the second sensing electrode TSE2_6. For example, the third sensing electrode TSE3 may form a capacitor with the second sensing electrode TSE2_6. Therefore, the third sensing electrode TSE3 along with the second sensing electrode TSE2_6 may operate as a sensing electrode of a mutual capacitance type touch sensor.

The sub-electrodes SUE1, SUE2, SUE3, and SUE4 may be connected to the first sensing lines SL1. In addition, the sub-electrodes SUE1, SUE2, SUE3, and SUE4 of one of adjacent first sensing electrodes TSE1 may be electrically connected to the sub-electrodes SUE1, SUE2, SUE3, and SUE4 of the other of the adjacent first sensing electrodes TSE1 through the first sensing lines SL1, respectively. The second sensing electrodes TSE2_6 may be connected to second sensing lines SL2, and the third sensing electrodes TSE3 may be connected to third sensing lines SL3.

According to various exemplary embodiments, a touch sensor and a display device can prevent (or reduce) the sensitivity at a rounded corner from being decreased. Thus, the touch sensor and display device can decrease a difference in touch sensitivity between regions.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A touch sensor comprising:
a base comprising:
a sensing region comprising a rounded corner; and
a non-sensing region outside the sensing region;
first sensing electrode columns extending in a first direction on the base, each first sensing electrode column among the first sensing electrode columns comprising first sensing electrodes, each first sensing electrode among the first sensing electrodes comprising sub-electrodes; and
second sensing electrode columns alternately disposed with the first sensing electrode columns on the base, each second sensing electrode column among the second sensing electrode columns comprising second sensing electrodes,
wherein sub-electrodes of one of adjacent first sensing electrodes among the first sensing electrodes are separated from one another and electrically connected to respective sub-electrodes of another of the adjacent first sensing electrodes,
wherein a sub-electrode closest to the rounded corner among the sub-electrodes comprises a rounded edge corresponding to the rounded corner, and
wherein a second sensing electrode closest to the rounded corner among the second sensing electrodes comprises:
a rounded edge corresponding to the rounded corner; and
a protrusion part protruding toward the sub-electrode comprising the rounded edge.

2. The touch sensor of claim 1, wherein the protrusion part extends into a patterned portion of an adjacent first sensing electrode column among the first sensing electrode columns.

3. The touch sensor of claim 2, wherein an area of the sub-electrode comprising the rounded edge is less than respective areas of other sub-electrodes among the sub-electrodes.

4. The touch sensor of claim 3, wherein a boundary between the protrusion part and the sub-electrode comprising the rounded edge is inclined with respect to the first direction.

5. The touch sensor of claim 4, wherein the boundary between the protrusion part and the sub-electrode comprising the rounded edge comprises a bending point.

6. The touch sensor of claim 4, further comprising:
first sensing lines connected to the first sensing electrodes; and
second sensing lines connected to the second sensing electrodes,
wherein each first sensing electrode among the first sensing electrodes comprises N sub-electrodes, N being a positive integer greater than one, and
wherein a J-th sub-electrode in the one of the adjacent first sensing electrodes and an (N−J+1)-th sub electrode in the another of the adjacent first sensing electrodes are electrically connected to each other via a first sensing line among the first sensing lines, J being a positive integer less than or equal to N.

7. The touch sensor of claim 6, wherein a first sensing line among the first sensing lines or a second sensing line among the second sensing lines is disposed in a space corresponding to the boundary between the protrusion part and the sub-electrode comprising the rounded edge.

8. The touch sensor of claim 4, further comprising:
a dummy pattern in a space corresponding to the boundary between the protrusion part and the sub-electrode comprising the rounded edge.

9. The touch sensor of claim 3, wherein a portion of the boundary between the protrusion part and the sub-electrode comprising the rounded edge has a curved shape.

10. The touch sensor of claim 9, wherein all of the boundary between the protrusion part and the sub-electrode comprising the rounded edge has a curved shape.

11. The touch sensor of claim 9, wherein:
another portion of the boundary between the protrusion part and the sub-electrode comprising the rounded edge has a curved shape, the portion of the boundary and the another portion of the boundary being disposed at respective distal ends of the boundary; and
a connection portion of the boundary connects the portion of the boundary and the another portion of the boundary, the connection portion being shaped differently than the portion of the boundary and the another portion of the boundary.

12. The touch sensor of claim 11, wherein the connection space of the boundary comprises a bending point.

13. The touch sensor of claim 9, wherein the protrusion part is more adjacent to the rounded corner than the sub-electrode comprising the rounded edge.

14. The touch sensor of claim 1, wherein a sum of areas of the sub-electrodes of a first sensing electrode among the first sensing electrodes is substantially the same as an area of a second sensing electrode among the second sensing electrodes.

15. A touch sensor comprising:
a base comprising:
  a sensing region comprising a rounded corner; and
  a non-sensing region outside the sensing region;
first sensing electrode columns extending in a first direction on the base, each first sensing electrode column among the first sensing electrode columns comprising first sensing electrodes, each first sensing electrode among the first sensing electrodes comprising sub-electrodes;
second sensing electrode columns alternately disposed with the first sensing electrode columns on the base, each second sensing electrode column among the second sensing electrode columns comprising second sensing electrodes; and
a third sensing electrode closest to the rounded corner among the first sensing electrodes and the second sensing electrodes,
wherein sub-electrodes of one of adjacent first sensing electrodes among the first sensing electrodes are separated from one another and electrically connected to respective sub-electrodes of another of the adjacent first sensing electrodes.

16. The touch sensor of claim 15, wherein the third sensing electrode comprises a rounded edge corresponding to the rounded corner.

17. The touch sensor of claim 16, wherein:
each first sensing electrode among some of the first sensing electrodes comprises first to N-th sub-electrodes sequentially disposed and spaced apart from each other in the first direction, N being a positive integer; and
a first sensing electrode most adjacent to the third sensing electrode comprises less than N sub-electrodes.

18. The touch sensor of claim 17, further comprising:
a third sensing line connected to the third sensing electrode.

19. The touch sensor of claim 15, wherein the third sensing electrode forms a capacitor with a second sensing electrode among the second sensing electrodes.

20. A display device comprising:
a display panel configured to display an image; and
a touch sensor on the display panel, the touch sensor comprising:
  a sensing region comprising a rounded corner; and
  a non-sensing region outside the sensing region,
  wherein the touch sensor further comprises:
    first sensing electrode columns extending in a first direction, each first sensing electrode column among the first sensing electrode columns comprising first sensing electrodes, each first sensing electrode among the first sensing electrodes comprising sub-electrodes; and
    second sensing electrode columns alternately disposed with the first sensing electrode columns, each second sensing electrode column among the second sensing electrode columns comprising second sensing electrodes,
wherein sub-electrodes of one of adjacent first sensing electrodes among the first sensing electrodes are separated from one another and electrically connected to respective sub-electrodes of another of the adjacent first sensing electrodes,
wherein a sub-electrode closest to the rounded corner among the sub-electrodes comprises a rounded edge corresponding to the rounded corner, and
wherein a second sensing electrode closest to the rounded corner among the second sensing electrodes comprises:
  a rounded edge corresponding to the rounded corner; and
  a protrusion part protruding toward the sub-electrode comprising the rounded edge.

21. The display device of claim 20, wherein the protrusion part extends into a patterned portion of an adjacent first sensing electrode column among the first sensing electrode columns.

22. The display device of claim 21, wherein an area of the sub-electrode comprising the rounded edge is less than respective areas of other sub-electrodes among the sub-electrodes.

23. The display device of claim 22, wherein an area of the sub-electrode comprising the rounded edge is less than respective areas of other sub-electrodes among the sub-electrodes.

24. The display device of claim 23, wherein the boundary between the protrusion part and the sub-electrode comprising the rounded edge comprises a bending point.

25. The display device of claim 23, further comprising:
first sensing lines connected to the first sensing electrodes; and
second sensing lines connected to the second sensing electrodes,
wherein each first sensing electrode among the first sensing electrodes comprises N sub-electrodes, N being a positive integer greater than one, and
wherein a J-th sub-electrode in the one of the adjacent first sensing electrodes and an (N−J+1)-th sub electrode in the another of the adjacent first sensing electrodes are electrically connected to each other via a first sensing line among the first sensing lines, J being a positive integer less than or equal to N.

26. The display device of claim 22, wherein a portion of the boundary between the protrusion part and the sub-electrode comprising the rounded edge has a curved shape.

27. The display device of claim 26, wherein all of the boundary between the protrusion part and the sub-electrode comprising the rounded edge has a curved shape.

28. The display device of claim 26, wherein:
another portion of the boundary between the protrusion part and the sub-electrode comprising the rounded edge has a curved shape, the portion of the boundary and the another portion of the boundary being disposed at respective distal ends of the boundary; and
a connection portion of the boundary connects the portion of the boundary and the another portion of the boundary, the connection portion being shaped differently than the portion of the boundary and the another portion of the boundary.

29. The display device of claim 28, wherein the connection space of the boundary comprises a bending point.

30. The display device of claim 26, wherein the protrusion part is more adjacent to the rounded corner than the sub-electrode comprising the rounded edge.

31. The display device of claim 20, wherein a sum of areas of the sub-electrodes of a first sensing electrode among the first sensing electrodes is substantially the same as an area of a second sensing electrode among the second sensing electrodes.

32. A display device comprising:
a display panel configured to display an image; and
a touch sensor on the display panel, the touch sensor comprising:
   a sensing region comprising a rounded corner; and
   a non-sensing region outside the sensing region,
wherein the touch sensor further comprises:
   first sensing electrode columns extending in a first direction, each first sensing electrode column among the first sensing electrode columns comprising first sensing electrodes, each first sensing electrode among the first sensing electrodes comprising sub-electrodes;
   second sensing electrode columns alternately disposed with the first sensing electrode columns, each second sensing electrode column among the second sensing electrode columns comprising second sensing electrodes; and
   a third sensing electrode closest to the rounded corner among the first sensing electrodes and the second sensing electrodes, and
wherein sub-electrodes of one of adjacent first sensing electrodes among the first sensing electrodes are separated from one another and electrically connected to respective sub-electrodes of another of the adjacent first sensing electrodes.

33. The display device of claim 32, wherein the third sensing electrode comprises a rounded edge corresponding to the rounded corner.

34. The display device of claim 33, wherein:
each first sensing electrode among some of the first sensing electrodes comprises first to N-th sub-electrodes sequentially disposed and spaced apart from each other in the first direction, N being a positive integer; and
a first sensing electrode most adjacent to the third sensing electrode comprises less than N sub-electrodes.

35. The display device of claim 32, wherein the third sensing electrode forms a capacitor with a second sensing electrode among the second sensing electrodes.

* * * * *